(12) United States Patent
Laing et al.

(10) Patent No.: US 12,521,126 B2
(45) Date of Patent: Jan. 13, 2026

(54) SURGICAL DRILL WITH AUTOMATIC RETRACTION AND ASSOCIATED METHODS AND SYSTEMS

(71) Applicant: Hubly Inc., Lisle, IL (US)

(72) Inventors: Genevieve R. K. Laing, San Francisco, CA (US); Ryan Wood, Sausalito, CA (US); Allison T. Tse, San Francisco, CA (US); Gerhard E. F Pawelka, Lexington, MA (US); Amit Bhasker Ayer, Chicago, IL (US); Nathanael David Andrews, Palo Alto, CA (US); Casey Mimi Grage, Vienna, VA (US)

(73) Assignee: Hubly Inc., Lisle, IL (US)

( * ) Notice: Subject to any disclaimer, the term of this patent is extended or adjusted under 35 U.S.C. 154(b) by 706 days.

(21) Appl. No.: 17/909,233

(22) PCT Filed: Mar. 4, 2021

(86) PCT No.: PCT/US2021/020928
§ 371 (c)(1),
(2) Date: Sep. 2, 2022

(87) PCT Pub. No.: WO2021/178706
PCT Pub. Date: Sep. 10, 2021

(65) Prior Publication Data
US 2023/0088846 A1  Mar. 23, 2023

Related U.S. Application Data

(60) Provisional application No. 62/986,384, filed on Mar. 6, 2020.

(51) Int. Cl.
| A61B 17/16 | (2006.01) |
| A61B 90/00 | (2016.01) |
| A61B 17/00 | (2006.01) |

(52) U.S. Cl.
CPC ...... *A61B 17/1613* (2013.01); *A61B 17/1617* (2013.01); *A61B 17/1628* (2013.01);
(Continued)

(58) Field of Classification Search
CPC . A61B 17/16; A61B 17/1633; A61B 17/1695; A61B 17/3494;
(Continued)

(56) References Cited

U.S. PATENT DOCUMENTS 5,158,552 A * 10/1992 Borgia ............... A61B 17/3496
604/164.12
5,876,405 A   3/1999 Del Rio et al.
(Continued)

FOREIGN PATENT DOCUMENTS

EP   2560793 B1   10/2014
EP   2128734 B1   4/2015
(Continued)

OTHER PUBLICATIONS

U.S. International Search Authority, International Search Report and Written Opinion, mailed Jun. 14, 2021 for PCT Application No. PCT/US21/20928 filed Mar. 4, 2021, 11 pages.
(Continued)

*Primary Examiner* — Larry E Waggle, Jr.
(74) *Attorney, Agent, or Firm* — Perkins Coie LLP

(57) ABSTRACT

The present technology relates to surgical drilling devices, and associated systems and methods. In some embodiments, a surgical drilling device includes a drill bit and a retraction mechanism. The retraction mechanism can include a housing, a slide assembly within the housing and operably coupled to the drill bit, a spring element engaging the slide assembly, and a locking element coupled to the slide assembly. The locking element can be movable between a locked configuration and an unlocked configuration based on an (Continued)

amount of force applied by the drill bit to the slide assembly. When in the locked configuration, the locking element can secure the slide assembly to the housing. When in the unlocked configuration, the locking element can allow the spring element to displace the slide assembly proximally within the housing to retract the drill bit.

19 Claims, 21 Drawing Sheets

(52) U.S. Cl.
CPC ...... *A61B 17/1633* (2013.01); *A61B 17/1695* (2013.01); *A61B 90/08* (2016.02); *A61B 2017/00367* (2013.01); *A61B 2090/08021* (2016.02)

(58) Field of Classification Search
CPC ...... A61B 2090/08021; A61B 17/1613; A61B 17/1626
See application file for complete search history.

(56) References Cited

U.S. PATENT DOCUMENTS

| | | | |
|---|---|---|---|
| 5,993,454 | A | 11/1999 | Longo |
| 7,121,773 | B2 | 10/2006 | Mikiya et al. |
| D582,237 | S | 12/2008 | Chen |
| D582,740 | S | 12/2008 | Weinberg et al. |
| D615,837 | S | 5/2010 | Lopano et al. |
| 8,511,945 | B2 | 8/2013 | Apkarian et al. |
| D705,630 | S | 5/2014 | Patel et al. |
| 8,881,842 | B2 | 11/2014 | Borinato et al. |
| 9,022,949 | B2 | 5/2015 | Herndon |
| 9,162,331 | B2 | 10/2015 | Tang |
| 9,345,487 | B2 | 5/2016 | Herndon et al. |
| 9,561,544 | B2 * | 2/2017 | Walsh ............... A61B 17/1695 |
| 10,245,043 | B2 | 4/2019 | Xie |
| 10,471,576 | B2 | 11/2019 | Totsu |
| D899,208 | S | 10/2020 | Thompson |
| D906,076 | S | 12/2020 | James |
| D919,088 | S | 5/2021 | Fumex et al. |
| 11,130,217 | B2 | 9/2021 | Totsu |
| 11,154,307 | B2 | 10/2021 | Chiang |
| D964,135 | S | 9/2022 | Mori |
| D989,887 | S | 6/2023 | Bloch et al. |
| D990,267 | S | 6/2023 | Mori |
| D1,075,011 | S | 5/2025 | Grage et al. |
| 2005/0116673 | A1 | 6/2005 | Carl et al. |
| 2005/0131415 | A1 | 6/2005 | Hearn et al. |
| 2009/0245956 | A1 | 10/2009 | Apkarian et al. |
| 2011/0020084 | A1 | 1/2011 | Brett et al. |
| 2013/0126202 | A1 | 5/2013 | Oomori et al. |
| 2014/0239600 | A1 | 8/2014 | Walsh et al. |
| 2017/0202560 | A1 | 7/2017 | Bjorn et al. |
| 2017/0348010 | A1 | 12/2017 | Chiang |
| 2018/0250020 | A1 | 9/2018 | Carusillo |
| 2019/0150954 | A1 | 5/2019 | Xie |
| 2020/0054410 | A1 | 2/2020 | Pfotenhauer et al. |
| 2021/0378707 | A1 | 12/2021 | Lindekugel et al. |
| 2024/0382214 | A1 | 11/2024 | Qadir et al. |

FOREIGN PATENT DOCUMENTS

| | | |
|---|---|---|
| EP | 2380704 B1 | 4/2015 |
| EP | 1651374 B1 | 11/2016 |
| EP | 2913155 B1 | 10/2021 |
| WO | 2020113144 A1 | 6/2020 |

OTHER PUBLICATIONS

Hubly Surgical 90Secs, publication date Jun. 19, 2022 [online] URL: https://www.youtube.com/watch?v=jHhoZXHbCA (Year: 2022).
A Better Cranial Drill, Hubly Surgical, publication date Jun. 6, 2022, [online] URL: https://web.archive.org/web/20220606211418/ https://magazine.northwestern.edu/innovation/hubly-surgical-cranial-drill-brain-surgery-casey-grage/ (Year: 2022).
ISR/US International Search Report and Written Opinion for PCT International patent application No. PCT/US2022/042807 filed Sep. 7, 2022, mailed Jan. 3, 2023, Applicant: Hubly Inc., 9 pages.
Extended European search report issued May 14, 2025 for European patent application No. 22868019.5, Applicant: Hubly Inc., 9 pages.
Extended European search report issued Feb. 15, 2024 for European patent application No. 21764111.7, Applicant: Hubly Inc., 9 pages.

* cited by examiner

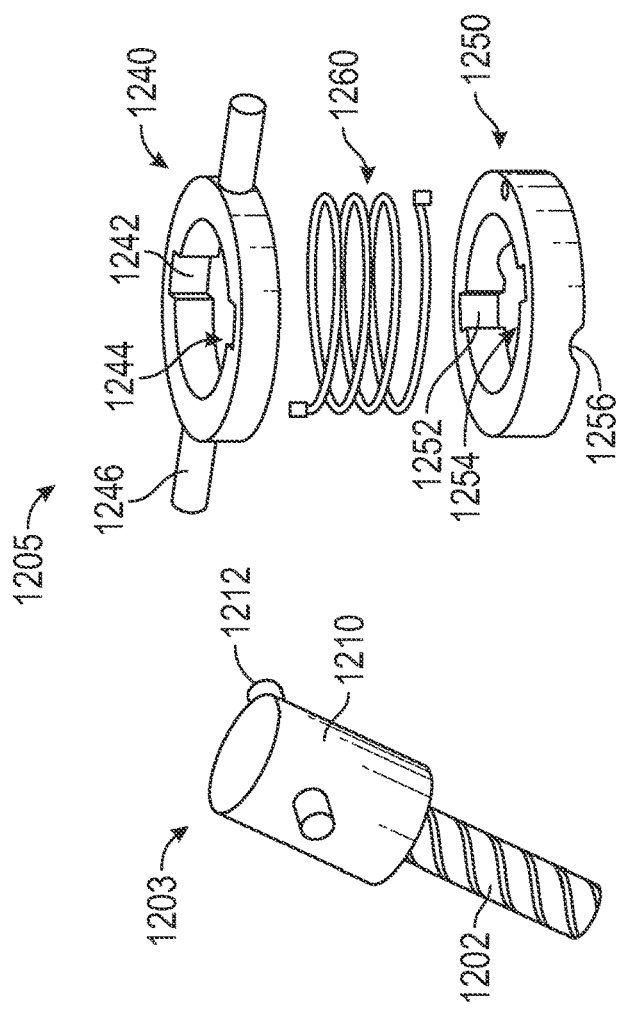
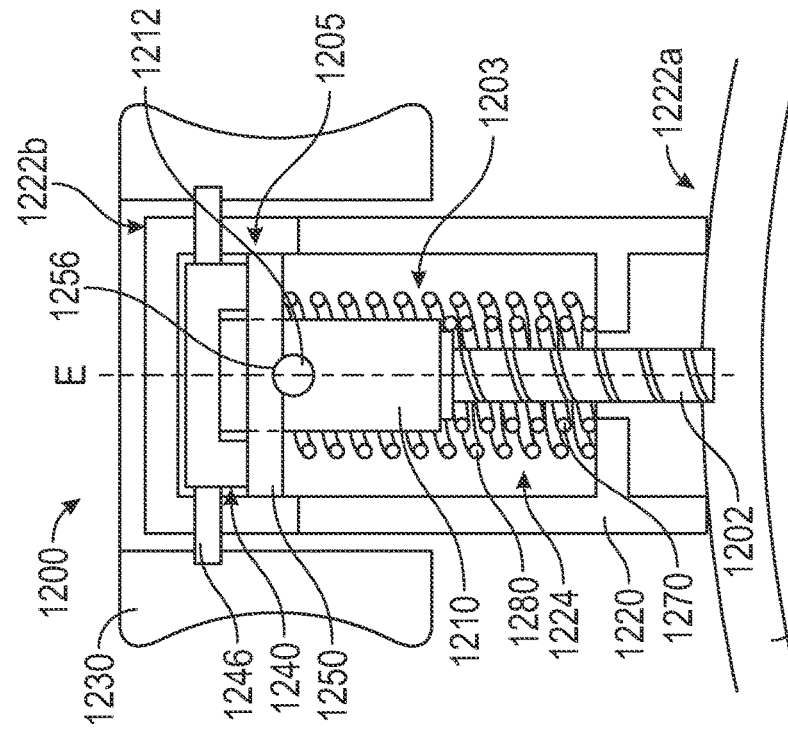
FIG. 9C
FIG. 9B
FIG. 9A

SURGICAL DRILL WITH AUTOMATIC RETRACTION AND ASSOCIATED METHODS AND SYSTEMS

CROSS-REFERENCE TO RELATED APPLICATIONS INCORPORATED BY REFERENCE

The present application claims priority to U.S. Provisional App. No. 62/986,384, titled SURGICAL DRILL WITH AUTOMATIC RETRACTION AND ASSOCIATED METHODS AND SYSTEMS, which was filed on Mar. 6, 2020, and is incorporated herein by reference in its entirety.

TECHNICAL FIELD

The present technology generally relates to medical devices and, in particular, to surgical devices and systems including a drill retraction mechanism.

BACKGROUND

Many medical conditions require access to the brain for the purpose of placing a catheter or electrode. For example, hydrocephalus is a condition where cerebrospinal fluid accumulates in the brain and may lead to a life-threatening pressure build-up in the brain. Placement of an external ventricular drain (EVD) is a typical treatment for hydrocephalus. In order to place an EVD, a drill is used to penetrate the skull and a catheter is inserted into to the ventricle in the brain. The drill commonly used today is a hand-crank drill that is guided and controlled by a neurosurgeon's skill and feel. The current procedure is complication prone and often results in a misplaced catheter. A misplaced catheter is ineffective for the EVD, introduces the potential for infection, and may independently cause physical damage to the brain.

There is another device, the Ghajar Guide, that adds components to improve the EVD procedure, but it is only used by a small minority of neurosurgeons due to the additional complexity, components, and steps involved. The Ghajar Guide is not used in the majority of all procedures because surgeons often find it adds complexity and additional steps to the surgery and increases cost.

BRIEF DESCRIPTION OF THE DRAWINGS

FIGS. 9A-9E illustrate a retraction mechanism for use in a surgical drilling device configured in accordance with embodiments of the present technology.

DETAILED DESCRIPTION

Figure 1A:
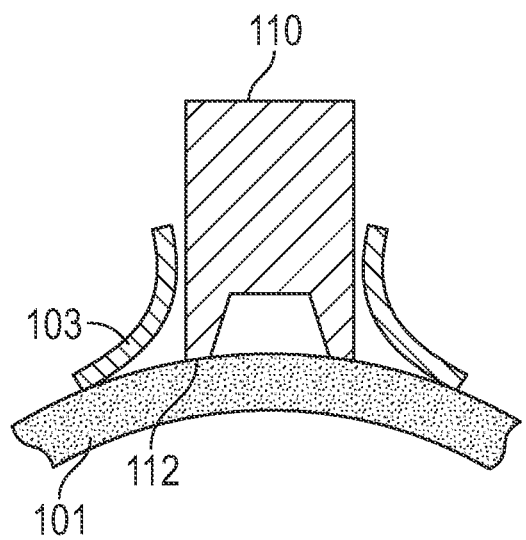
FIGS. 1A-1D are partially schematic illustrations of a process for drilling into a skull using a surgical drilling system configured in accordance with embodiments of the present technology.

The present technology is generally directed to surgical drilling devices, and associated systems and methods. A surgical drilling device configured in accordance with embodiments of the present technology can include, for example, a drill bit configured to drill through a tissue (e.g., bone) and a retraction mechanism configured to automatically retract the drill bit based on predefined criteria (e.g., sensing that the drill has fully penetrated a bone). The retraction mechanism can include a slide assembly operably coupled to the drill bit and a locking element coupled to the slide assembly. The locking element can move between a locked configuration in which the slide assembly is secured and an unlocked configuration in which the slide assembly can be displaced to retract the drill bit. In some embodiments, the locking element moves between the locked and unlocked configurations based on an amount of force applied by the drill bit to the slide assembly. For example, when the force decreases below a threshold (e.g., due to the drill bit penetrating through the bone), the locking element can move to the unlocked configuration such that the slide assembly moves proximally to automatically retract the drill bit.

The terminology used in the description presented below is intended to be interpreted in its broadest reasonable manner, even though it is being used in conjunction with a detailed description of certain specific embodiments of the present technology. Certain terms may even be emphasized below; however, any terminology intended to be interpreted in any restricted manner will be overtly and specifically defined as such in this Detailed Description section. Additionally, the present technology can include other embodiments that are within the scope of the examples but are not described in detail with respect to FIGS. 1A-9E.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Reference throughout this specification to relative terms such as, for example, "generally," "approximately," "substantially," and "about" are used herein to mean the stated value plus or minus 10%.

Although certain embodiments herein are described in the context of surgical procedures performed on the skull, this is not intended to be limiting, and a person of ordinary skill in the art will appreciate that the present technology can be applied equally to surgical procedures performed on other parts of the body (e.g., the spine or other orthopedic treatment sites). Additionally, although some embodiments are discussed with reference to treatment of hydrocephalus, the present technology can be readily adapted for treatment of other indications, such as subdural hematomas, epilepsy, intracranial hemorrhage, stroke, traumatic brain injury, cancers of the nervous system, brain tumors, or orthopedic indications. Moreover, although certain embodiments are described in terms of a procedure for placing an EVD, the present technology can also be used in other procedures, such as shunt placement, craniotomy, deep brain stimulation, deep brain electrode placement, minimally invasive catheter evacuation followed by thrombolysis (MISTIE), cooling for acute ischemic brain damage (COOL AID), Ommaya reservoir placement, laser thermal ablation therapy, lumbar puncture, spinal tap, or brain-machine interfaces.

The headings provided herein are for convenience only and do not interpret the scope or meaning of the claimed present technology.

A. Surgical Drilling Systems and Associated Methods

Currently, the procedure for placing an EVD, a life-saving device for removing excess fluid from the brain, uses a hand-powered crank drill ("hand-crank drill") to drill through the skull and place a catheter in the ventricle of the brain. The most commonly used hand-crank drill provides no protection for preventing misplacement or plunge. Instead, the hand-crank drill relies on neurosurgeon skill and feel. The commonly used hand-crank drill has several problems. Particularly, the commonly used hand-crank drill is hand-powered, has no mechanism to prevent plunging into the brain after puncturing the skull during drilling, has no alignment guide to ensure the proper drilling angle, includes too many components leading to unnecessary complexity, does not include scalp retraction, and does not include any hemostasis mechanism.

As a result of these device shortcomings, the current procedures that use the existing hand-crank drill exhibit higher complication rates due to catheter misplacement or other surgeon errors (including plunge). During drilling, the drill is prone to shift drilling angle. Maintaining a substantially perpendicular drilling angle can be important for properly placing the catheter in the correct position. Further, maintaining a substantially perpendicular catheter insertion trajectory can also be important for properly placing the catheter. Thus, both misaligned holes formed by misaligned drilling and misaligned catheter insertion trajectory can lead to misplacement of the catheter.

Another problem that can arise during drilling occurs as the drill penetrates the skull. If the neurosurgeon applies too much pressure while drilling and does not detect that he or she is about to penetrate the skull, the neurosurgeon may plunge the drill bit into the brain. This type of plunge can result in severe injury, complications, or death.

The present technology provides surgical drilling systems and devices configured to reduce or prevent catheter misplacement and/or drill plunge, among other advantages. Both problems, misplacement and plunge, cause substantial complications leading to poor outcomes for patients and increased costs for hospitals. In some embodiments, a surgical drilling system includes a guide-hub that maintains both the substantially perpendicular drilling angle and the substantially perpendicular catheter insertion trajectory. The system can also include a retraction mechanism (also known as an automatic plunge protection mechanism or a harness) that withdraws the drill bit automatically as the drill bit penetrates the skull, as described in further detail below. In addition to these problems, the embodiments described herein can provide an integrated solution that brings together a complete guide-hub and drill system with other solution elements, including one or more of: (1) an electric drill, (2) an integrated component system with the guide-hub, (3) a scalp retractor assembly (also known as a scalp retraction mechanism), (4) a hemostasis mechanism, (5) a catheter guide compatible with the guide-hub, (6) augmented reality tracking and integration for further reducing misplacements, (7) positioning sensors for further reducing misplacements, and/or (8) a tunneling compatible guide-hub.

In some embodiments, the present technology provides a surgical drill that addresses multiple problems in an easy-to-use integrated hub-drill system. Particularly, the embodiments herein can include some or all of the following features: (1) reduction of catheter misplacements with a drill guide-hub that maintains drill position and/or orientation; (2) prevention of plunge with an automatic retraction mechanism; (3) improvement of surgeon efficiency, speed, endurance, and/or accuracy with an electric power drive system; (4) improvement of surgeon usability (e.g., increasing efficiency, speed, and/or accuracy) with an integrated surgical guide-hub and drill system; (5) improvement of integration with a scalp retractor assembly integrated directly in the guide-hub; (6) prevention of excessive bleeding, infection, and complications with a hemostasis mechanism; (7) further reduction of catheter misplacements with a catheter guide compatible with the guide-hub; (8) further reduction of catheter misplacements with an augmented reality tracking and integration system; (9) further reduction of catheter misplacements with positioning sensors; and/or (10) further simplification of surgical procedures with a tunneling compatible guide-hub.

Production of the various embodiments disclosed herein can be accomplished in several ways. For example, individual parts can be machined by a machinist and assembled into the system. As another example, the system can be manufactured in an industrial manufacturing process that may include automated assembly, forming or casting components, and/or any other industrial manufacturing processes. In a further example, the system can be produced using advanced manufacturing tools such as a 3D printer and/or computer numerical control (CNC) machine, for example. In short, the embodiments herein can be produced using several techniques known to those of skill in the art. The selection of processes and materials can be informed by addressing the issues of biocompatibility, durability, and/or cost according to embodiments described herein.

In some embodiments, the systems and devices described herein are used as a drill to penetrate the skull during surgery. For example, the embodiments described herein can be used in a procedure for placement of an EVD, which includes placing a catheter into the brain. In some embodiments, the procedure includes retracting the skin using the integrated scalp retractor assembly. The guide-hub can be placed against the skull after the skin is retracted. The drill can be guided through the guide-hub to penetrate the skull. Immediately after penetrating the skull, the retraction mechanism can prevent the drill bit from plunging into the brain. Then, the drill can be removed from the guide-hub and a catheter guide can be used with the guide-hub to maintain the position and alignment of the catheter as it is inserted into the brain. Other features or components of the solution may be used along with this process as described further herein.

Figure 1B:
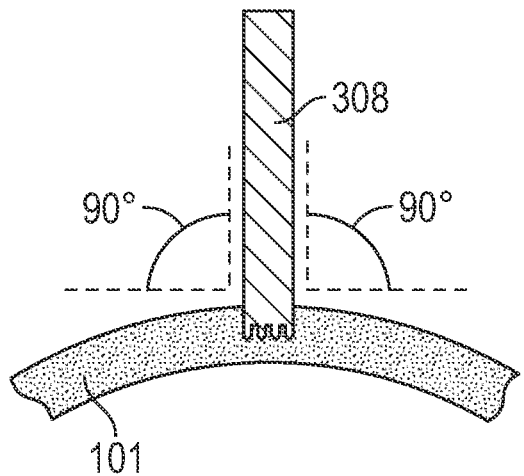
Figure 1C:
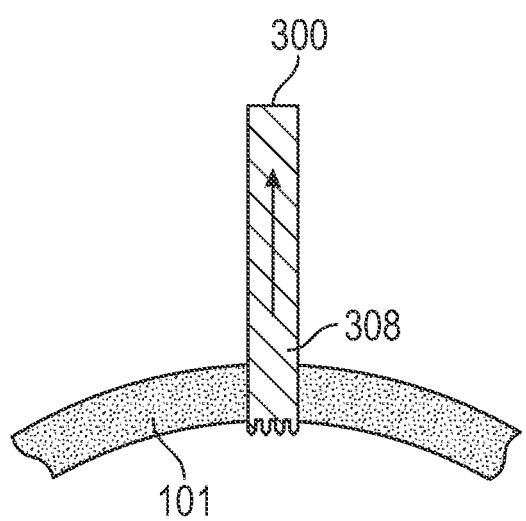
Figure 1D:
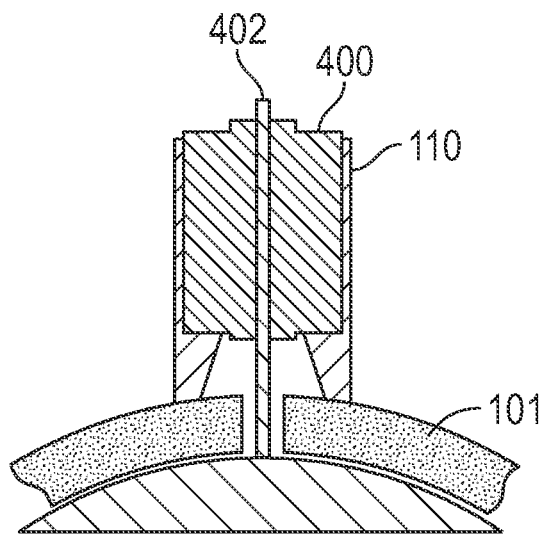

FIGS. 1A-1D are partially schematic illustrations of a process for drilling into a skull 101 using a surgical drilling system configured in accordance with embodiments of the present technology. In FIG. 1A, the scalp 103 is opened and a guide-hub 110 is placed on the skull 101. The support legs 112 of the guide-hub 110 are placed against the skull 101 and maintain a substantially perpendicular alignment. In FIG. 1B, a drill bit 308 supported by a central drill shell is aligned inside the guide-hub 110 (not shown in FIGS. 1B-1C merely for purposes of clarity) and drilling is performed with perpendicularity maintained by the guide-hub 110. In FIG. 1C, as the drill bit 308 penetrates the skull 101, a retraction mechanism 300 detects when the drill bit 308 punctures the skull 101 and retracts the drill bit 308 automatically or prevents further plunge. In FIG. 1D, a catheter guide 400 is inserted inside the guide-hub 110 and used to guide a catheter 402 for accurate placement. The guide-hub 110 maintains the substantially perpendicular alignment of the catheter guide 400, which facilitates a substantially perpendicular catheter trajectory and reduced misplacement of the catheter 402.

Figure 2A:
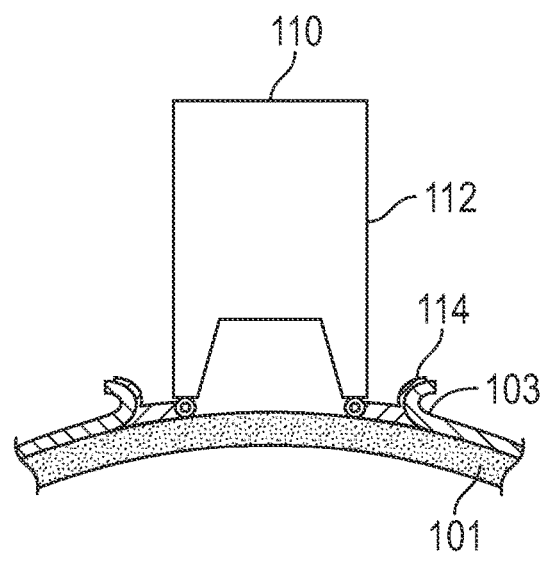
FIGS. 2A-2D are partially schematic side cross-sectional views of a process for drilling into a skull using a surgical drilling system in accordance with embodiments of the present technology.

FIGS. 2A-2D are partially schematic side cross-sectional views of a process for drilling into a skull 101 using a surgical drilling system in accordance with embodiments of the present technology. FIGS. 2A-2D illustrate the process described with respect to FIGS. 1A-1D in greater detail. FIG. 2A illustrates accessing the skull 101, where a guide-hub 110 is placed against the skull 101 after an incision is made in the scalp 103. The guide-hub 110 includes support legs 112 for contacting the skull 101. In some embodiments, the guide-hub includes a scalp retractor assembly 114 for holding back the scalp 103. Integration of the scalp retractor assembly 114 into the guide-hub 110 can simplify the surgical sequence and maintain component alignment and integrity. The scalp retractor assembly 114 can include a hemostasis mechanism (not shown) to reduce bleeding from the scalp 103 (e.g., to reduce or prevent complications). For example, the hemostasis mechanism can be or include one or more pressure clips that apply clamping pressure on the scalp 103. In other embodiments, the scalp retractor assembly 114 and/or hemostasis mechanism can be omitted.

Figure 2B:
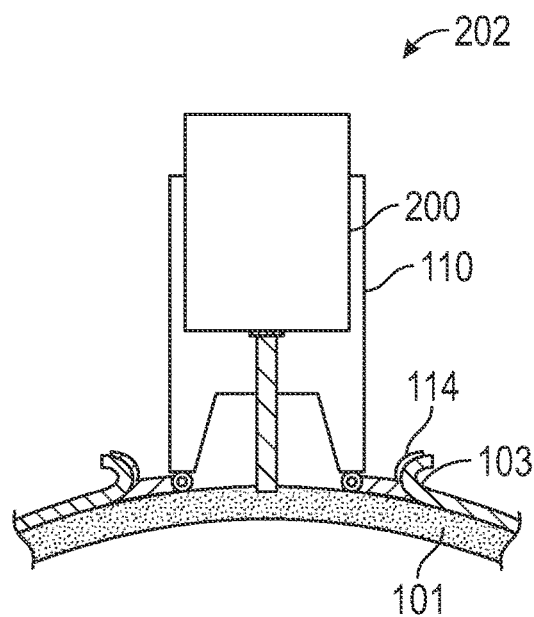

FIG. 2B illustrates aligning a drill or drilling device 202 (shown schematically) and drilling through the skull 101. The guide-hub 110 can include a lumen or cavity extending therethrough for receiving at least a portion of the drill 202. The guide-hub 110 can maintain perpendicularity with the skull 101 while the drill 202 is guided through the guide-hub 110. Optionally, the drill 202 can include or be coupled to a central drill shell 200 that spins inside the guide-hub 110. The rotation of the central drill shell 200 can be driven by the drill 202 or by a motor (not shown).

Figure 2C:
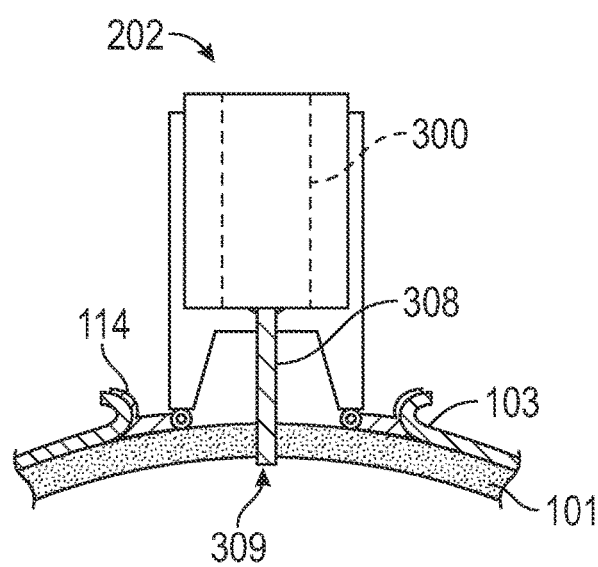

FIG. 2C illustrates a retraction mechanism 300 (shown schematically in broken lines) for automatically retracting a drill bit 308 of the drill 202. During the drilling process, a drill bit tip 309 of the drill bit 308 contacts the skull 101 and applies a force thereto. The counteracting force of the skull 101 against the drill bit tip 309 can be transmitted proximally through the drill bit 308 and against the retraction mechanism 300. The force on the retraction mechanism 300 can maintain the retraction mechanism 300 in a locked configuration so that the drill bit 308 does not retract and can drill into the skull 101. As soon as the drill bit 308 or a portion thereof (e.g., drill bit tip 309) penetrates the skull 101, the counteracting force on the drill bit tip 309 decreases or ceases, which causes a corresponding decrease in the force against the retraction mechanism 300. The decrease in force against the retraction mechanism 300 can cause the retraction mechanism 300 to transition into an unlocked configuration that allows the drill bit 308 to be automatically retracted in a proximal direction away from the skull 101. After penetrating the skull 101, the drill 202 (e.g., including central drill shell 200, retraction mechanism 300, and/or drill bit 308) can be removed from the guide-hub 110. The retraction mechanism 300 is expected to prevent injury, complication, and death from over-drilling and plunging of the drill bit 308. Additional features of the retraction mechanism 300 are described in further detail below.

Figure 2D:
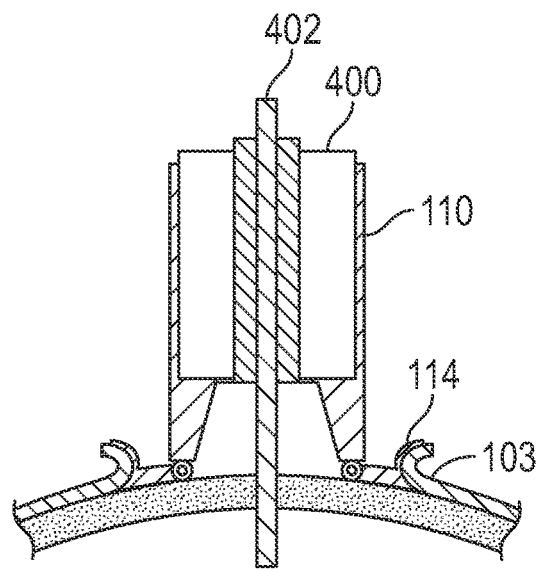

FIG. 2D illustrates a catheter guide 400 for guiding the trajectory of a catheter 402. The catheter guide 400 can be inserted into the guide-hub 110 after the drilling components are removed. In other embodiments, the catheter guide 400 can be integrated into the guide-hub 110 and is not separately inserted. The catheter guide 400 can maintain the perpendicularity of the catheter 402 during insertion by referencing the alignment of the guide-hub 110 that is maintained by the support legs 112 set against the skull 101.

As one of skill in the art will appreciate from the disclosure herein, various components of the surgical drilling systems described above can be omitted without deviating from the scope of the present technology. Likewise, additional components not explicitly described above may be added to the surgical drilling systems without deviating from the scope of the present technology. Accordingly, the systems described herein are not limited to those configurations expressly identified, but rather encompasses variations and alterations of the described systems. Moreover, the following paragraphs provide additional description of various aspects of the present technology. One skilled in the art will appreciate that the following aspects can be incorporated into any of the systems described above.

B. Automatic Retraction Mechanisms

As described above, the present technology provides surgical drilling systems and devices including an automatic retraction mechanism. In some embodiments, the retraction mechanism is configured to pull the drill bit back once the drill bit penetrates through the target tissue (e.g., bone) in order to reduce or avoid damage to non-target tissue (e.g., the brain). For example, the retraction mechanism can be configured to detect or otherwise respond to changes in force on the drill bit (e.g., a decrease in force) that indicate the drill bit has penetrated through the target tissue. The embodiments described herein can retract the drill bit automatically such that the clinician can operate the drill without having to manually initiate the retraction process. As a result, the embodiments herein are expected to improve safety and ease of operation of surgical drilling devices.

FIGS. 3-9E illustrate surgical drilling devices and retraction mechanisms configured in accordance with various embodiments of the present technology. As will be appreciated by one of ordinary skill in the art, the features of the embodiments of FIGS. 3-9E can be combined with each other in many different ways. Additionally, any of the embodiments of FIGS. 3-9E can be combined with or otherwise incorporated in the embodiments described with respect to FIGS. 1A-2D.

Figure 3:
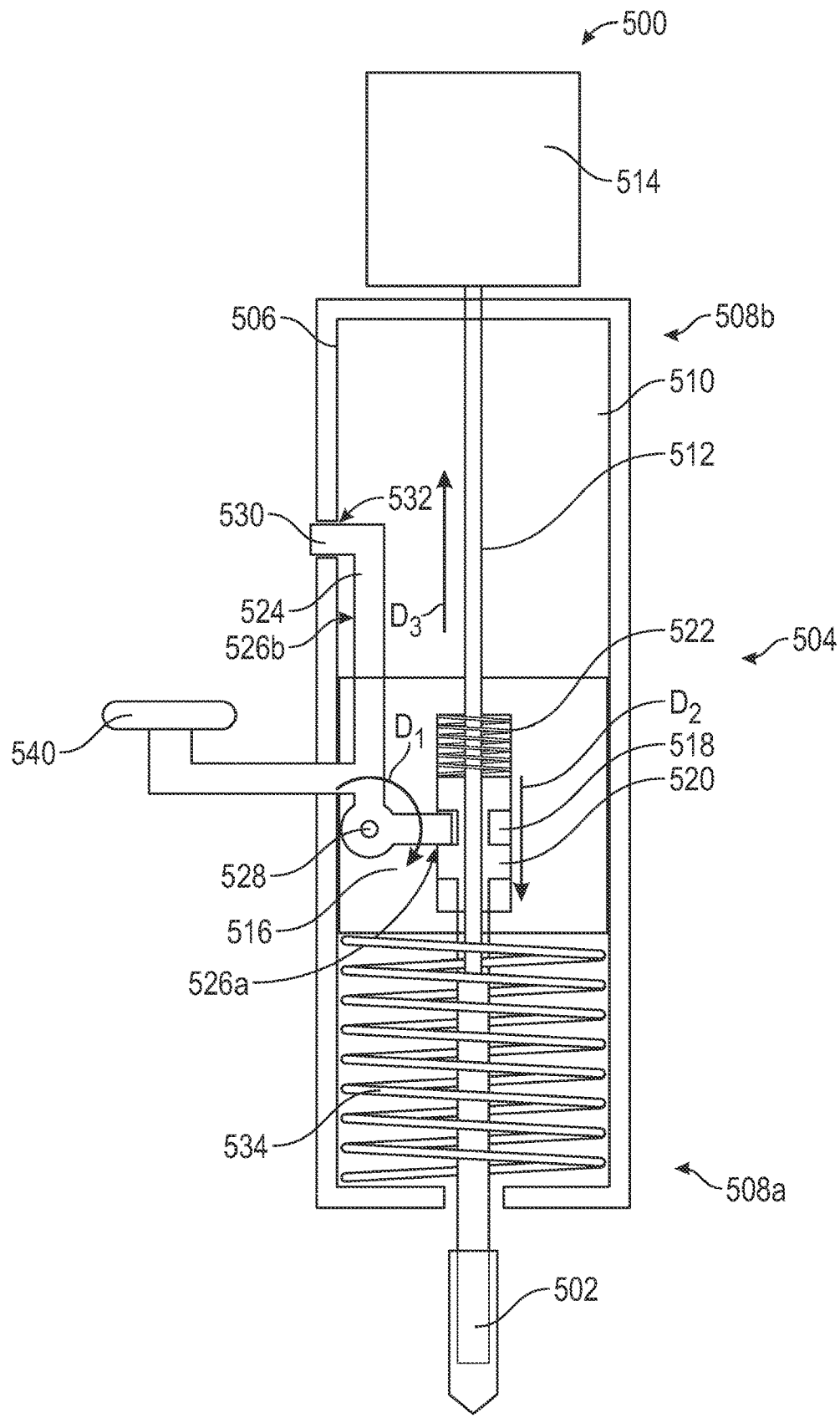
FIG. 3 is a partially schematic cross-sectional view of a surgical drilling device configured in accordance with embodiments of the present technology.

FIG. 3 is a partially schematic cross-sectional view of a surgical drilling device 500 configured in accordance with embodiments of the present technology. The device 500 includes a drill bit 502 configured to drill into a tissue (e.g., a skull). The drill bit 502 can include an abrasive tip or a cutting tip. In some embodiments, the drill bit 502 is hollow with an abrasive or cutting edge around the diameter of the drill bit 502. The drill bit 502 can be or include a twist bit, a unibit, a hole saw, a coated abrasive bit, a center drill bit, a core drill, a spade bit, a lip and spur drill bit, an augur bit, a center bit, or a Forstner bit. In some embodiments, the drill bit 502 can be configured without a sharp tip to reduce complication rates. For example, an abrasive tip, a core drilling tip, or a Forstner bit may reduce complication rates.

The surgical device 500 further includes a retraction mechanism 504 operably coupled to the drill bit 502. The retraction mechanism 504 includes a housing 506 having a distal end portion 508a, a proximal end portion 508b, and an internal cavity 510. The drill bit 502 can be located external to the housing 506 at or near the distal end portion 508a. In some embodiments, the drill bit 502 is coupled to an elongated shaft 512 (e.g., via a chuck or other adapter—not shown) that extends through the internal cavity 510 of the housing 506 from the distal end portion 508a to the proximal end portion 508b. The elongated shaft 512 can be a drive shaft that couples the drill bit 502 to a motor 514 configured to actuate the rotation of the drill bit 502. In some embodiments, the elongated shaft 512 is a splined motor shaft that transmits torque from the motor 514 to the drill bit 502 while allowing for movement of the drill bit 502 along the longitudinal axis of the device 500. In the illustrated embodiment, the motor 514 is positioned external to the housing 506 at or near the proximal end portion 508b. In other embodiments, the motor 514 can be positioned within the internal cavity 510 of the housing, e.g., at or near the proximal end portion 508b.

The retraction mechanism 504 further includes a slide assembly 516 positioned within the internal cavity 510 of the housing 506. The slide assembly 516 can be configured to move longitudinally within the housing 506, e.g., in a proximal direction and/or in a distal direction. The slide assembly 516 can be operably coupled to the drill bit 502 (e.g., via the elongated shaft 512) such that the drill bit 502 moves in concert with the slide assembly 516. For example, the drill bit 502 can move proximally when the slide assembly 516 moves proximally, and can move distally when the slide assembly 516 moves distally. The slide assembly 516 can be connected to the drill bit 502 in various ways. For example, in the illustrated embodiment, the slide assembly 516 includes an internal channel 518 with a collar structure 520 and a first spring element 522 received therein. The elongated shaft 512 can be coupled to the collar structure 520, and the collar structure 520 can be coupled to the interior of the slide assembly 516 via the first spring element 522.

The retraction mechanism 504 also includes a locking element 524 coupled to the slide assembly 516 to control the movement thereof. For example, the locking element 524 can be movable between a locked configuration and an unlocked configuration. When in the locked configuration (e.g., as shown in FIG. 3), the locking element 524 can secure the slide assembly 516 to the housing 506 so as to reduce or prevent longitudinal movement of the slide assembly 516 relative to the housing 506. When in the unlocked configuration (not shown), the locking element 524 can permit the slide assembly 516 to move longitudinally within the housing 506, e.g., along a proximal direction and/or a distal direction.

The locking element 524 can be configured in many different ways. For example, in the illustrated embodiment, the locking element 524 is configured as an elongated lever including a first end portion 526a, a second end portion 526b, and a pivot portion 528 between the first and second end portions 526a-b. The locking element 524 can be pivotally coupled to the slide assembly 516 at the pivot portion 528 so that the locking element 524 can rotate (e.g., in a counterclockwise direction and/or a clockwise direction). The first end portion 526a can be coupled to the collar structure 520 (e.g., via a protrusion, tab, etc. received within a mating groove, recess, etc. within the collar structure 520). The second end portion 526b can be configured to couple to the housing 506. For example, the second end portion 526b can include a protrusion 530 or other like feature that fits within a corresponding aperture 532 in the wall of the housing 506. When the locking element 524 is in the locked configuration, the protrusion 530 can be positioned within and engage the aperture 532 to maintain the position of the slide assembly 516 relative to the housing 506. To transition the locking element 524 into the unlocked configuration, the locking element 524 can be rotated (e.g., clockwise direction $D_1$) about pivot portion 528, thereby moving the protrusion 530 out of and away from the aperture 532. The slide assembly 516 can then be moved relative to the housing 506.

In some embodiments, the locking element 524 is configured to automatically switch from the locked configuration to the unlocked configuration based on the amount of force applied by the drill bit 502 to the slide assembly 516. For example, when the force is above a certain threshold (e.g., indicating that the drill bit 502 is contacting the target tissue), the locking element 524 can remain in the locked configuration. When the force falls below the threshold and/or reaches zero (e.g., indicating that the drill bit 502 has penetrated at least partially through the target tissue), the locking element 524 can automatically move into the unlocked configuration, thereby allowing the slide assembly 516 to move proximally within the housing 506 to retract the drill bit 502.

For example, in the illustrated embodiment, when the drill bit 502 is contacting and/or drilling into a relatively hard tissue (e.g., bone), the tissue can apply a proximally-directed force against the drill bit 502 that opposes the distally-directed force applied by the drill bit 502 to the tissue. The drill bit 502 can transmit at least some or all of the counteracting force to the slide assembly 516 (e.g., at least 50%, 75%, 90%, 95%, or 99% of the counteracting force). In some embodiments, the drill bit 502 transmits some or all of the force to the elongated shaft 512, which in turn transmits some or all of the force to the collar structure 520. As a result, the collar structure 520 can move proximally relative to the slide assembly 516 within internal channel 518. The proximal movement of the collar structure 520 can rotate the locking element 524 about pivot portion 528 in a counterclockwise direction to maintain the protrusion 530 within the aperture 532. As a result, the locking element 524 remains in the locked configuration and prevents movement of the slide assembly 516. The proximal movement of the collar structure 520 can also apply a force to the first spring element 522 to deform it from its resting or unloaded length into a loaded length (e.g., a compressed or elongated length). For example, in some embodiments, the first spring element 522 is positioned proximal to the collar structure 520 such that the proximal movement of the collar structure 520 also compresses the first spring element 522 relative to its resting or unloaded length. In other embodiments, the first spring element 522 can be positioned distal to the collar structure 520 such that proximal movement of the collar structure 520 elongates the first spring element 522 relative to its resting or unloaded length.

When the drill bit 502 breaks partially or fully through the target tissue, the opposing force against the drill bit 502 can decrease or disappear altogether. As a result, the force applied by the drill bit 502 to the slide assembly 516 can also decrease, triggering the locking element 524 to automatically move into the unlocked configuration. For example, in the illustrated embodiment, when the force applied by the drill bit 502 against the collar structure 520 decreases to an amount less than the spring force of the first spring element 522, the first spring element 522 can revert from its loaded length (e.g., expand or contract) back to its resting or unloaded length, thus engaging and displacing the collar structure 520 in a distal direction $D_2$. Due to the coupling between the collar structure 520 and the locking element 524, the distal movement of the collar structure 520 can rotate the locking element 524 about pivot portion 528 in the clockwise direction $D_1$, thus releasing the protrusion 530 from the aperture 532 to unlock the locking element 524.

Once the locking element 524 is in the unlocked configuration, the slide assembly 516 can be automatically displaced longitudinally towards the proximal end portion 508b of the housing 506 (e.g., along a proximal direction $D_3$) to retract the drill bit 502. In the illustrated embodiment, for example, the retraction mechanism 504 includes a second spring element 534 within the housing 506 (e.g., at or near the distal end portion 508a). The second spring element 534 can be coupled to or otherwise engage the slide assembly 516. In some embodiments, when the locking element 524 is in the locked configuration, the slide assembly 516 applies a force to the second spring element 534 to deform it from its resting or unloaded length into a loaded length (e.g., a compressed or elongated length). For example, in the illustrated embodiment, the second spring element 534 is positioned distally to the slide assembly 516 and is compressed by the slide assembly 516 to a length less than its resting or unloaded length. As a result, when the locking element 524 is unlocked, the second spring element 534 can expand towards its resting or unloaded length, thereby displacing the slide assembly 516 in the proximal direction $D_3$ and resulting in retraction of the drill bit 502. In alternative embodiments, the second spring element 534 can be positioned proximally to the slide assembly 516 such that when the locking element 524 is locked, the second spring element 534 is elongated by the slide assembly 516 to a length greater than its resting or unloaded length. When the locking element 524 is unlocked, the second spring element 534 can contract towards its resting or unloaded length to displace the slide assembly 516 proximally to retract the drill bit 502.

In some embodiments, the drill bit 502 is retracted entirely into the housing 506. In other embodiments, the drill bit 502 can be retracted only partially into the housing 506, or remains entirely outside the housing 506. The retraction distance (e.g., the distance between the initial position of the drill bit 502 and the retracted position of the drill bit 502) can be varied as desired. For example, the retraction distance can be at least 0.5 mm, 1 mm, 2 mm, 3 mm, 4 mm, 5 mm, 10 mm, 15 mm, 20 mm, or 25 mm. In some embodiments, the device 500 is configured to reduce or minimize the plunge distance of the drill bit 502 (e.g., the maximum distance the drill bit 502 travels past the target tissue before being retracted). For example, the device 500 can be configured to provide a plunge distance of no more than 10 mm, 9 mm, 8 mm, 7 mm, 6 mm, 5 mm, 4 mm, 3 mm, 2 mm, 1 mm, 0.5 mm, 0.2 mm, or 0.1 mm.

In some embodiments, the device 500 further includes a reset mechanism 540 (e.g., a button, trigger, etc.—shown schematically) for placing the device 500 back into the initial un-retracted state after retraction has occurred. For example, the reset mechanism 540 can allow the slide assembly to be moved distally within the housing 506 so that the drill bit 502 returns to its initial un-retracted position and the locking element 524 transitions back into the locked configuration and reengages the housing 506. In some embodiments, the operator can use the reset mechanism 540 to reset the device 500, e.g., before drilling into another tissue.

In some embodiments, the device 500 is configured to be a single-use disposable device. In other embodiments, certain device components can be reusable (e.g., the drill bit 502 and/or the motor 514) while other device components are intended to be single-use (e.g., the retraction mechanism 504). Optionally, the entire device 500 can be configured to be reusable. In such embodiments, the device 500 can be configured to be compatible with cleaning and sterilization processes known to those of skill in the art.

Figure 4A:
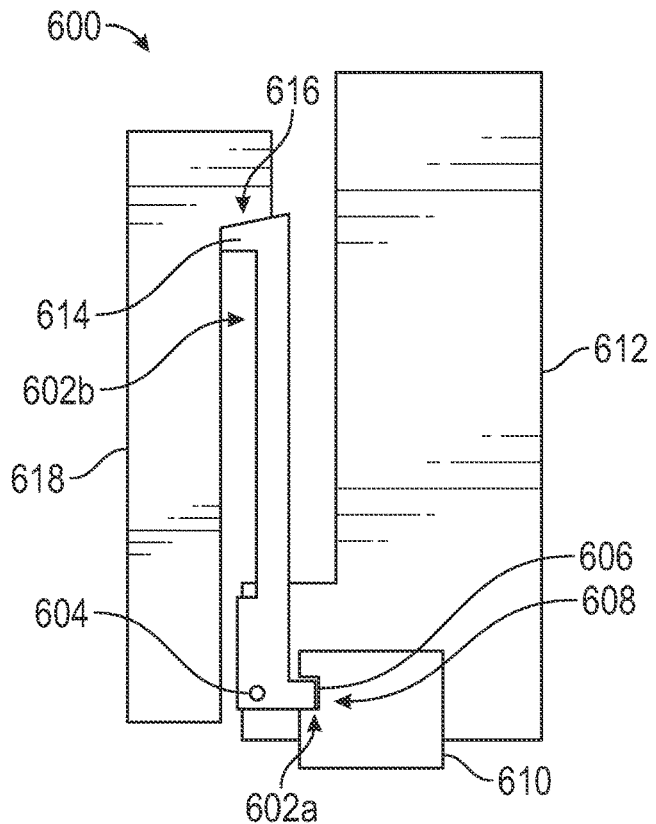
FIG. 4A is a partially schematic cross-sectional view of a locking element configured in accordance with embodiments of the present technology.

FIG. 4A is a partially schematic cross-sectional view of a locking element 600 configured in accordance with embodiments of the present technology. The features of the locking element 600 can be combined with or otherwise incorporated into the surgical drilling device 500 of FIG. 3. The locking element 600 includes a first end portion 602a, a second end portion 602b, and a pivot portion 604 between the first and second end portions 602a-b. The first end portion 602a can include a first protrusion 606 that engages a corresponding recess 608 in a collar structure 610 of a slide assembly 612. The second end portion 602b can include a second protrusion 614 that engages a corresponding aperture or recess 616 in a housing 618. The locking element 600 can be rotated counterclockwise about pivot portion 604 to engage the second protrusion 614 with the aperture 616 (e.g., a locked configuration), and can be rotated clockwise about pivot portion 604 to release the second protrusion 614 from the aperture 616 (e.g., an unlocked configuration). In the illustrated embodiment, the second protrusion 614 has a sloped, ramp-like proximal surface that engages a corresponding sloped, ramp-like distal surface of the aperture 616. As a result, the second protrusion 614 can slide along and disengage from the aperture 616 once the force against the drill bit (not shown) falls below a certain threshold, without requiring that the drill bit penetrate through the target tissue first. This approach can be advantageous for reducing or minimizing plunge distance.

Figure 4B:
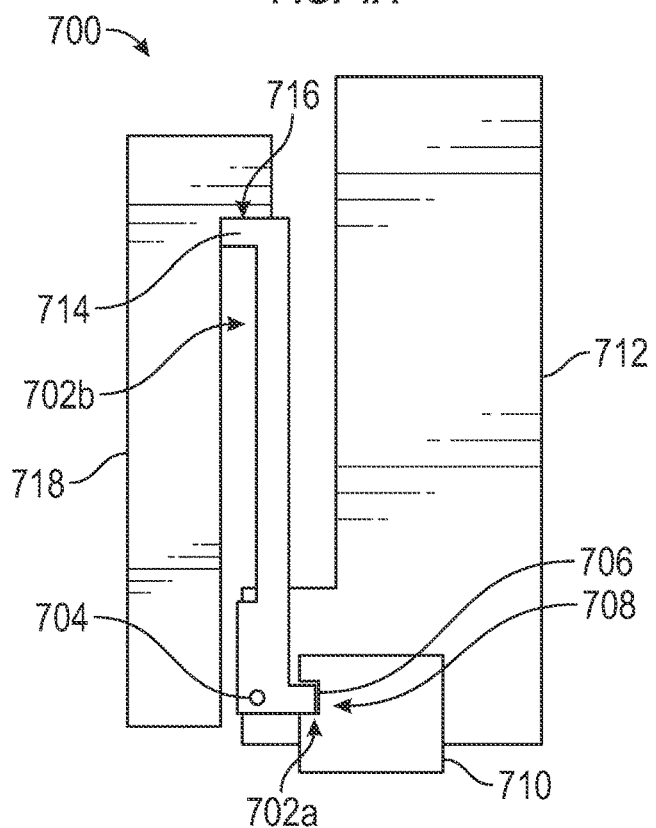
FIG. 4B is a partially schematic cross-sectional view of another locking element configured in accordance with embodiments of the present technology.

FIG. 4B is a partially schematic cross-sectional view of a locking element 700 configured in accordance with embodiments of the present technology. The locking element 700 can be generally similar to the locking element 600 described with respect to FIG. 4A such that like numbers (e.g., first end portion 702a versus first end portion 602a) are used to identify similar or identical components. Accordingly, discussion of the locking element 700 of FIG. 4B will be limited to those features that differ from the locking element 600 of FIG. 4A.

The locking element 700 includes a second end portion 702b that engages a corresponding aperture or recess 716 in a housing 718. The locking element 700 can be rotated counterclockwise about pivot portion 704 to engage the second protrusion 714 with the aperture 716 (e.g., a locked configuration), and can be rotated clockwise about pivot portion 704 to release the second protrusion 714 from the aperture 716 (e.g., an unlocked configuration). In the illustrated embodiment, the second protrusion 714 has a flat proximal surface that engages a flat distal surface of the aperture 716. In other embodiments, the surfaces of the second protrusion 714 and aperture 716 are not entirely flat, but have a sufficiently small angle or slope so as to produce mechanical interference that maintains the engagement of the second protrusion 714 and the aperture 716. As a result of the mechanical interference between the surfaces of the second protrusion 714 and the aperture 716, the locking element 700 can remain locked until the drill bit (not shown)

penetrates at least partially through the target tissue. The plunge depth of the drill bit can still be kept sufficiently small (e.g., less than or equal to 0.2 mm) to reduce the risk of inadvertent tissue injury. This approach is expected to allow the operator to modulate the amount of force applied against the target tissue without risking premature retraction of the drill bit.

Figure 5A:
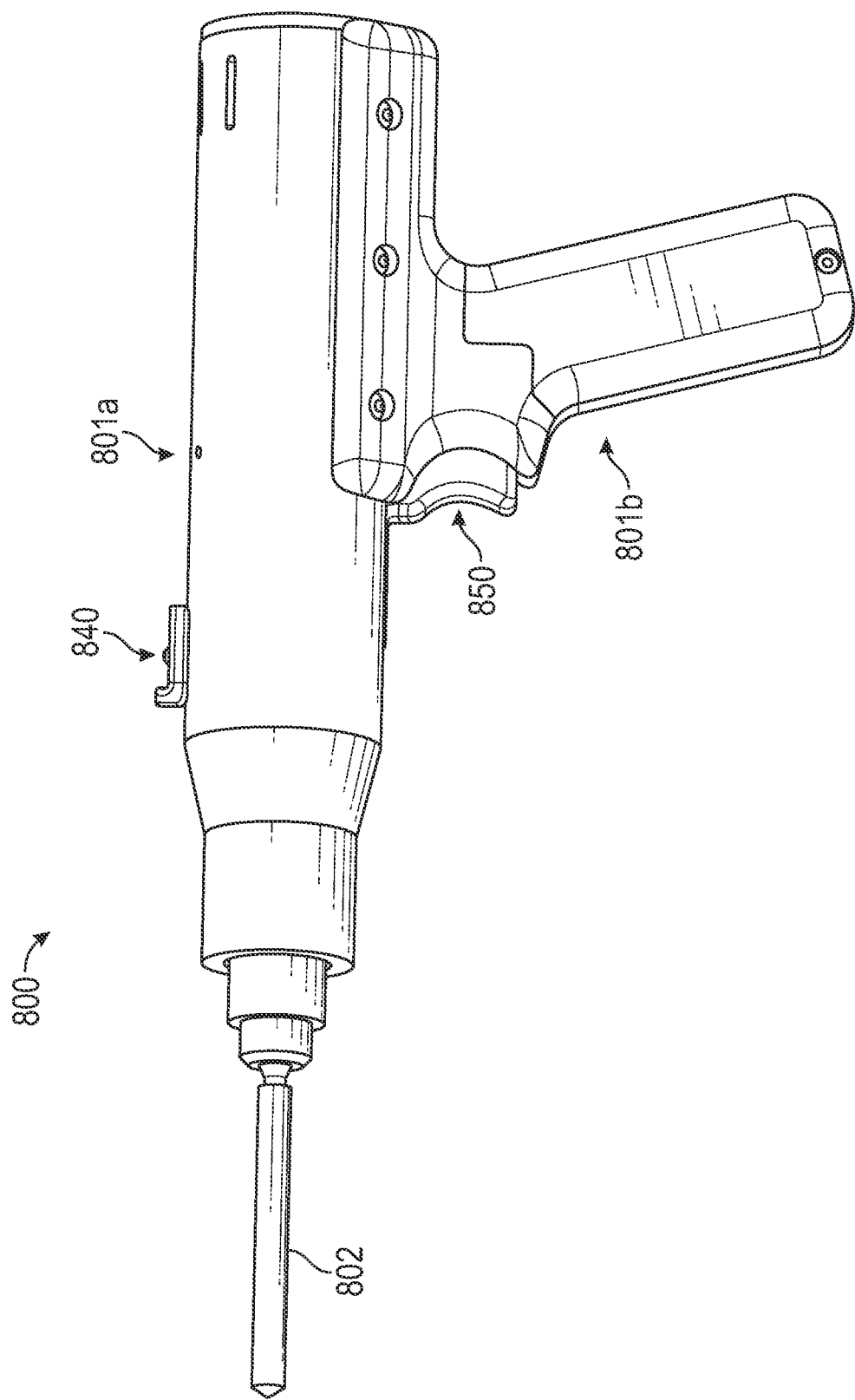
FIGS. 5A-5I illustrate another surgical drilling device configured in accordance with embodiments of the present technology.
Figure 5B:
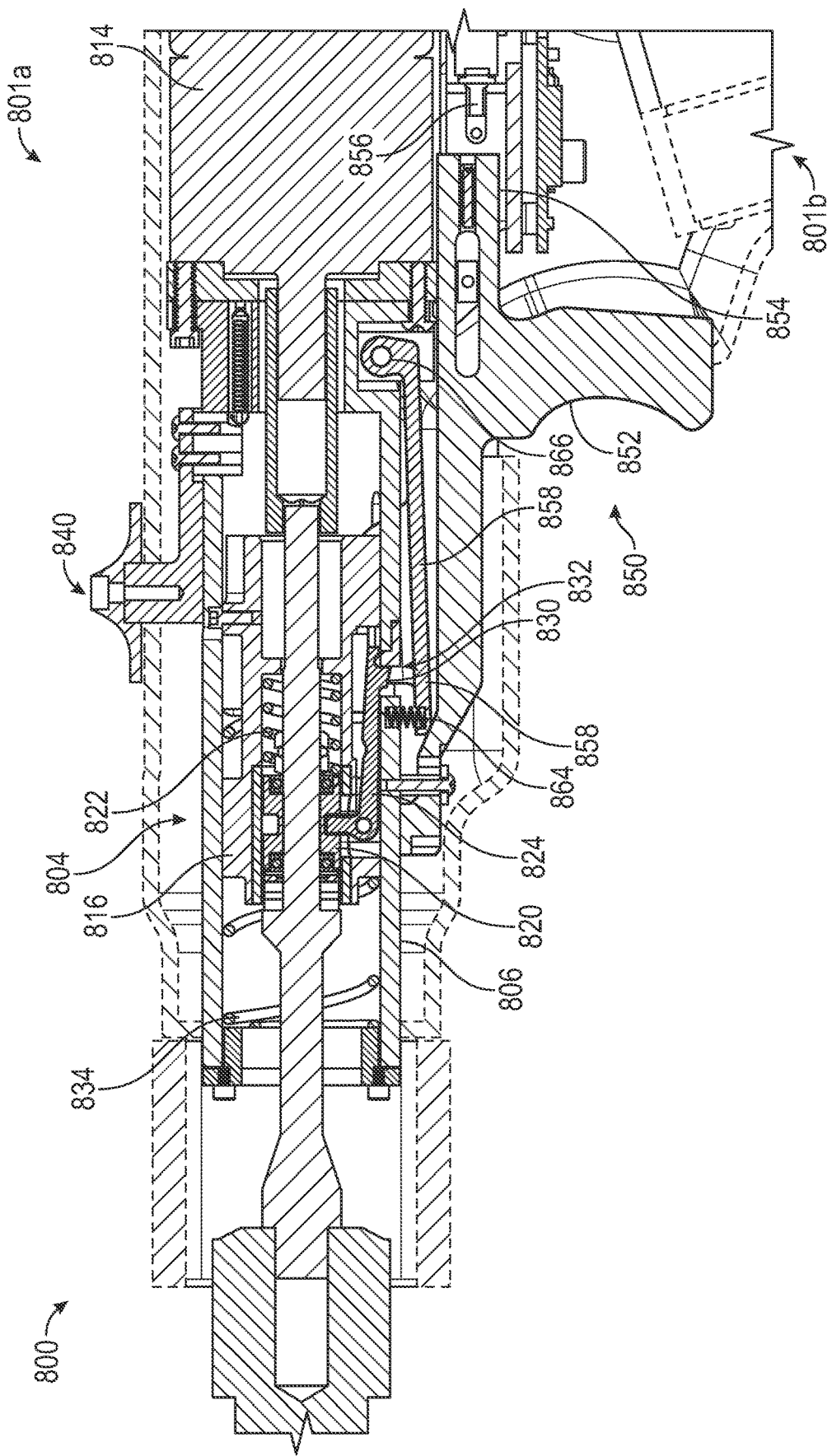
Figure 5C:
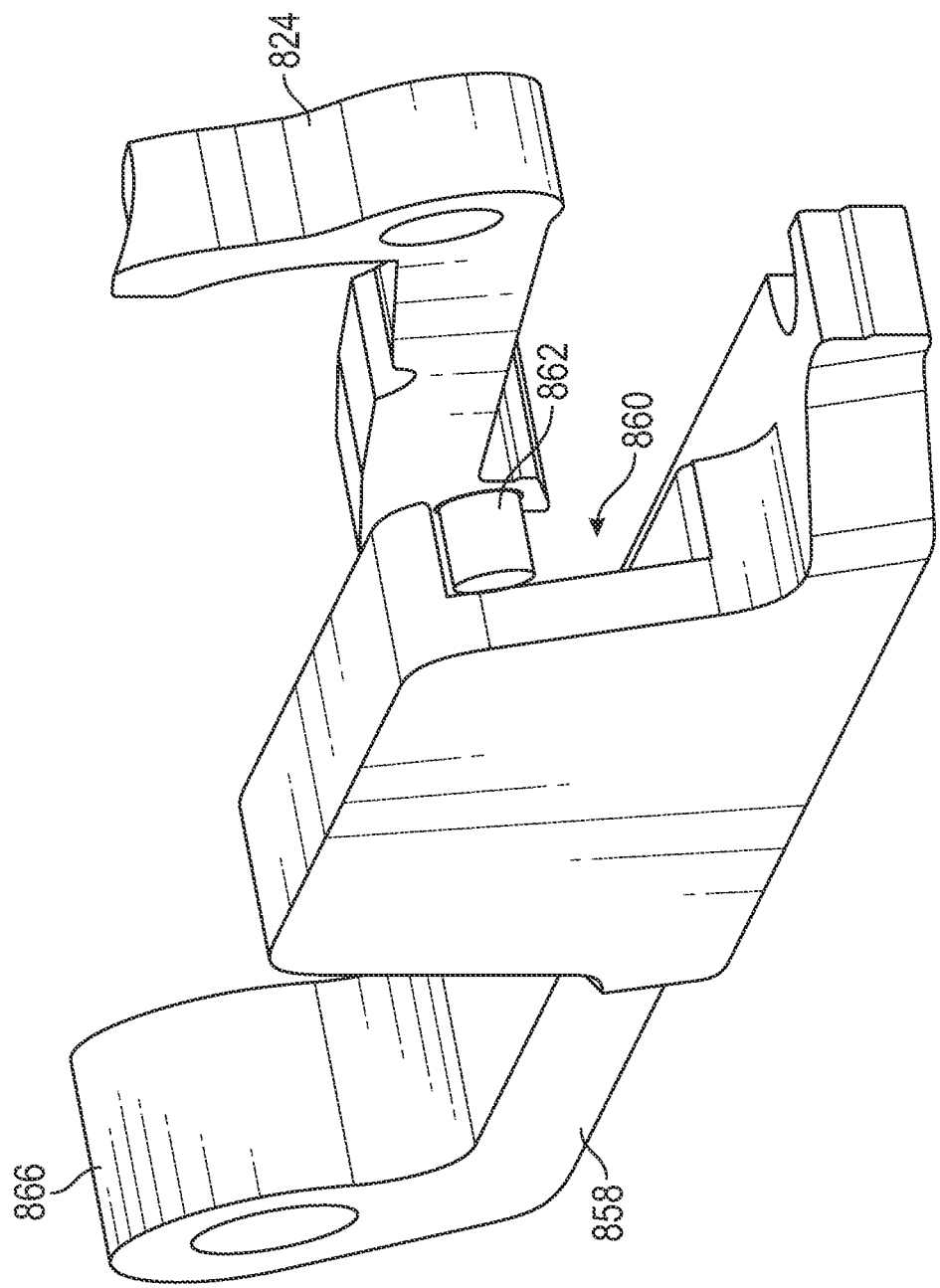

FIGS. 5A-5I illustrate a surgical drilling device 800 configured in accordance with embodiments of the present technology. More specifically, FIG. 5A is a perspective view of the device 800, FIG. 5B is a cross-sectional view of the device 800, FIG. 5C is a perspective view of a trigger mechanism of the device 800, and FIGS. 5D-5I are cross-sectional views of the device 800 in various stages of operation. The principle of operation of the device 800 can be generally similar to the device 500 described with respect to FIG. 3 such that like reference numbers (e.g., retraction mechanism 804 versus retraction mechanism 504) are used to indicate identical or similar components. Accordingly, the following discussion of the device 800 will be limited to those features that differ from the device 500 of FIG. 3.

Referring first to FIGS. 5A and 5B together, the device 800 includes a body portion 801a and a handle portion 801b. The body portion 801a can be an elongated barrel-shaped structure configured to house various components of the device 800, as described further below. The handle portion 801b can be coupled to the body portion 801a and can be shaped to be held by a clinician's hand. The device 800 also includes a drill bit 802 extending distally from the body portion 801a. The drill bit 802 is operably coupled to a retraction mechanism 804 (best seen in FIG. 5B) located within the body portion 801a. The components of the retraction mechanism 804 (e.g., housing 806, slide assembly 816, collar structure 820, first spring element 822, locking element 824, second spring element 834) can be generally similar or identical to the corresponding components previously described with respect to FIGS. 3-4B.

In some embodiments, the device 800 further includes a reset mechanism 840 and a trigger mechanism 850. The reset mechanism 840 can be configured to return the device 800 to an un-retracted operating state, as described in further detail below. The trigger mechanism 850 can be operably coupled to a motor 814 so that actuation of the trigger mechanism 850 by the clinician turns on the motor 814 to drive rotation of the drill bit 802. For example, in the illustrated embodiment, the trigger mechanism 850 includes a trigger slider 852 coupled to the body portion 801a and the handle portion 801b. The clinician can pull the trigger slider 852 in a proximal direction so that an engagement portion 854 of the trigger slider 852 contacts a switch or button 856 that turns on the motor 814. The trigger slider 852 can be spring-loaded or otherwise biased so that when the clinician releases the trigger slider 852, the trigger slider 852 moves in a distal direction, thus causing the engagement portion 854 to separate from the button 856 to turn off the motor 814.

Referring to FIGS. 5B and 5C together, the trigger mechanism 850 can be further configured to prevent retraction of the drill bit 802 when the device 800 is not drilling (e.g., when the motor 814 is off). For example, the trigger mechanism 850 can be configured to maintain the locking element 824 in the locked configuration when the trigger slider 852 has not been actuated. As best seen in FIG. 5C, the trigger mechanism 850 can include a trigger lever 858 having a recess or channel 860 therein that receives a post 862 on the locking element 824. The trigger lever 858 can be coupled to a third spring element 864 (FIG. 5B) that biases the trigger lever 858 downwards and/or rotates the trigger lever 858 counterclockwise around pivot portion 866. As a result, the trigger lever 858 can push the post 862 downwards, thereby rotating the locking element 824 clockwise so that the protrusion 830 of the locking element 824 remains within the aperture 832 of the housing 806.

Figure 5D:
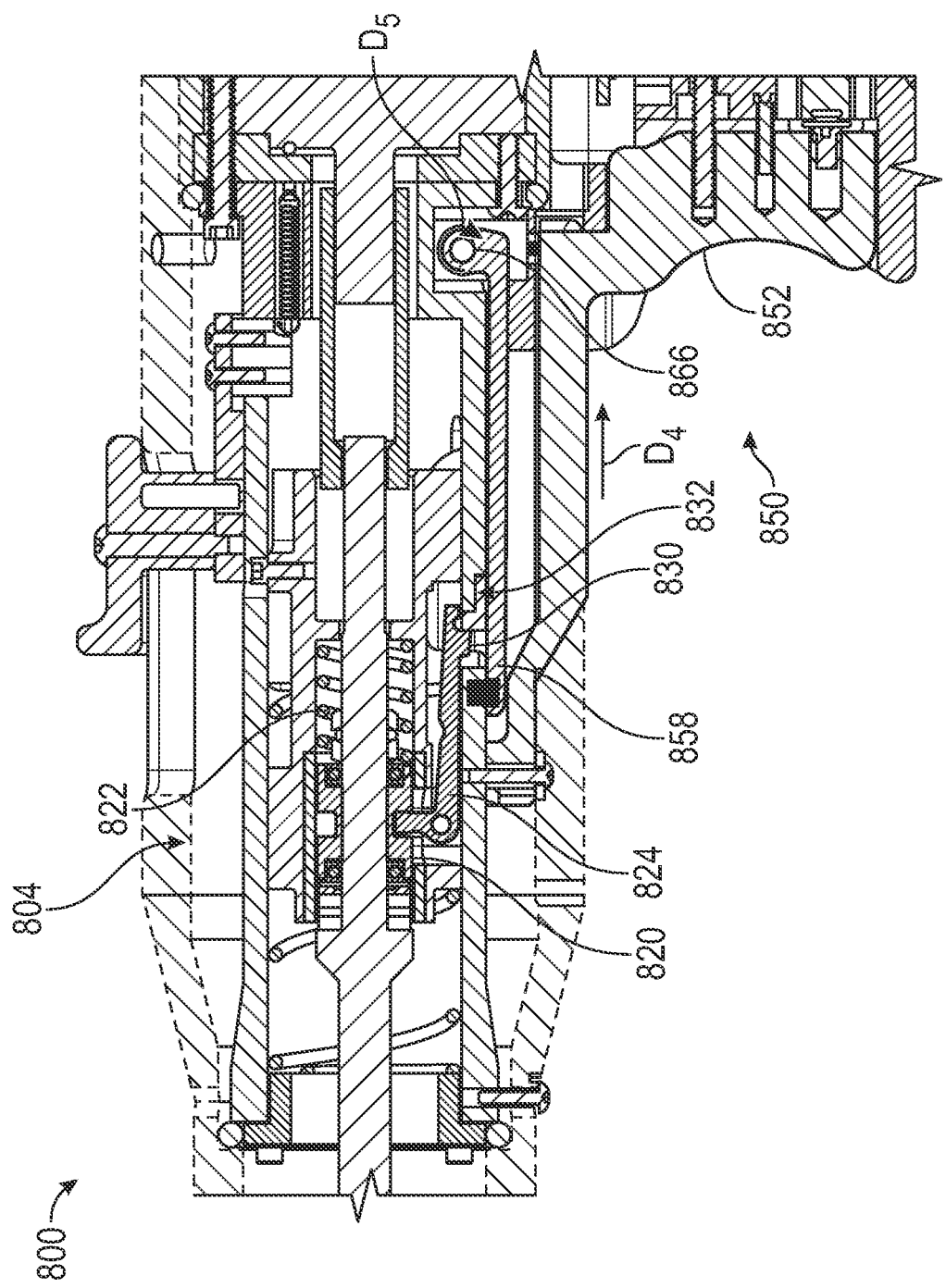

Referring to FIG. 5D, when the clinician positions the drill bit 802 against a target tissue and actuates the trigger mechanism 850 by moving the trigger slider 852 proximally (e.g., along direction $D_4$), the trigger slider 852 can engage the trigger lever 858, pushing it upwards and/or rotating it clockwise around pivot portion 866 (e.g., along direction $D_5$). As a result, the trigger lever 858 releases the locking element 824 and no longer pushes it downwards. However, the locking element 824 remains in the locked configuration with protrusion 830 positioned within aperture 832 due to the retraction mechanism 804 (e.g., collar structure 820 and first spring element 822), as previously described.

Figure 5E:
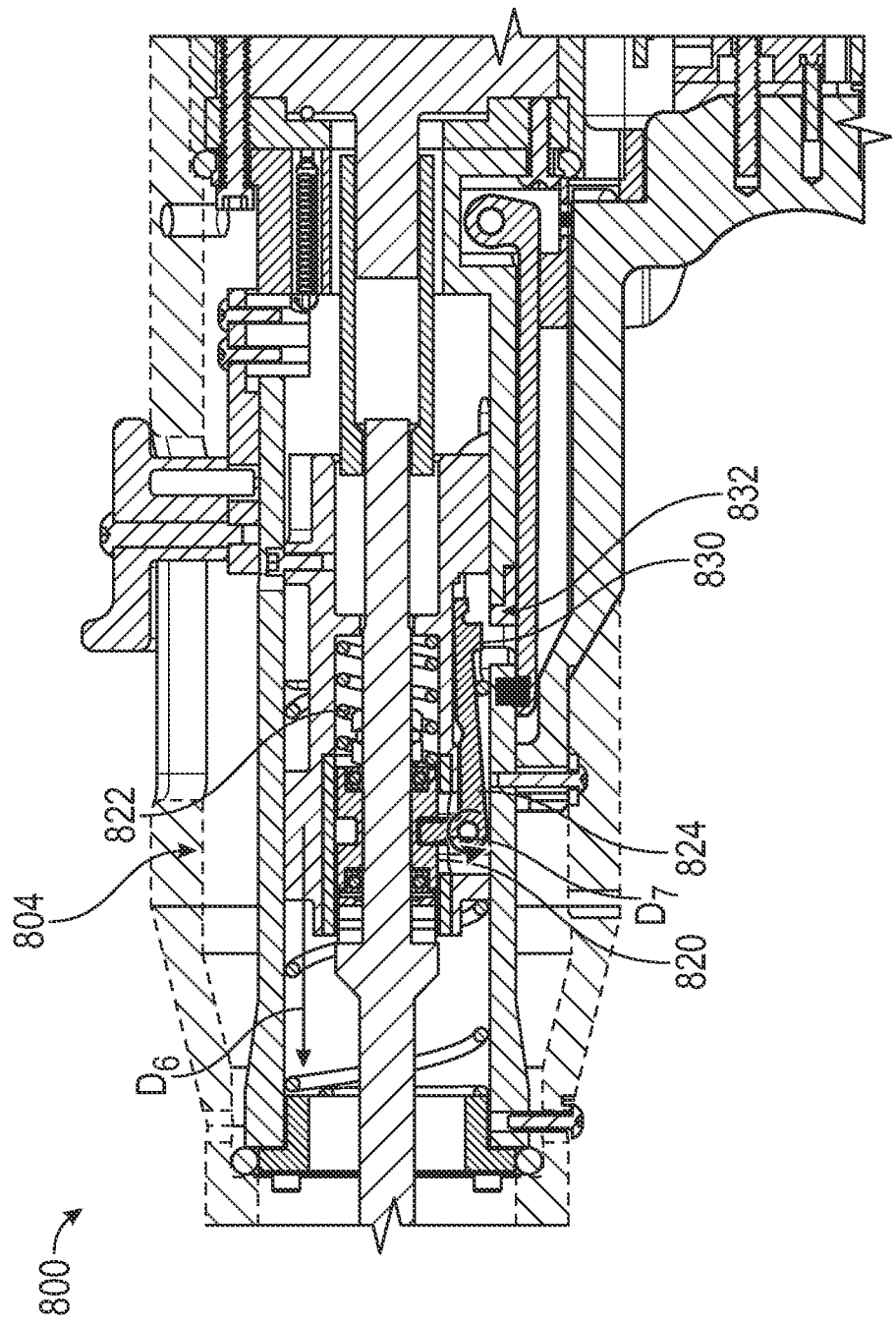

Referring to FIG. 5E, when the drill bit 802 penetrates at least partially through the target tissue, the reduced force on the drill bit 802 can cause the first spring element 822 to displace the collar structure 820 distally (e.g., along direction $D_6$), as previously described. As a result, the locking element 824 can move into the unlocked configuration, e.g., by rotating counterclockwise so that the protrusion 830 disengages from the aperture 832 (e.g., along direction $D_7$).

Figure 5F:
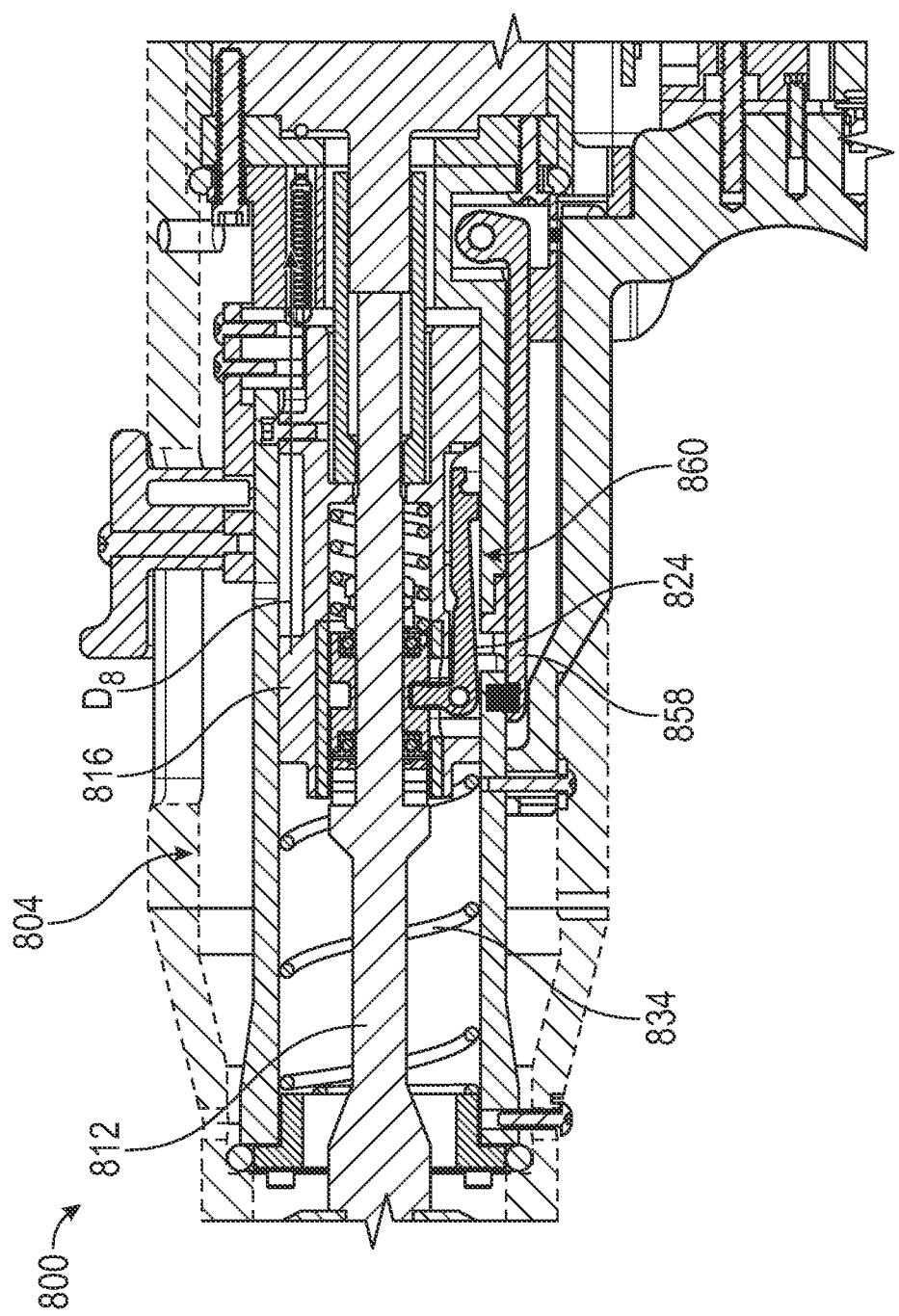

Referring to FIG. 5F, once the locking element 824 is in the unlocked configuration, the second spring element 834 can drive the slide assembly 816 proximally (e.g., along direction $D_8$), thereby retracting the drill bit 802 (e.g., via elongated shaft 812). The locking element 824 can also slide proximally within the channel 860 of the trigger lever 858.

Figure 5G:
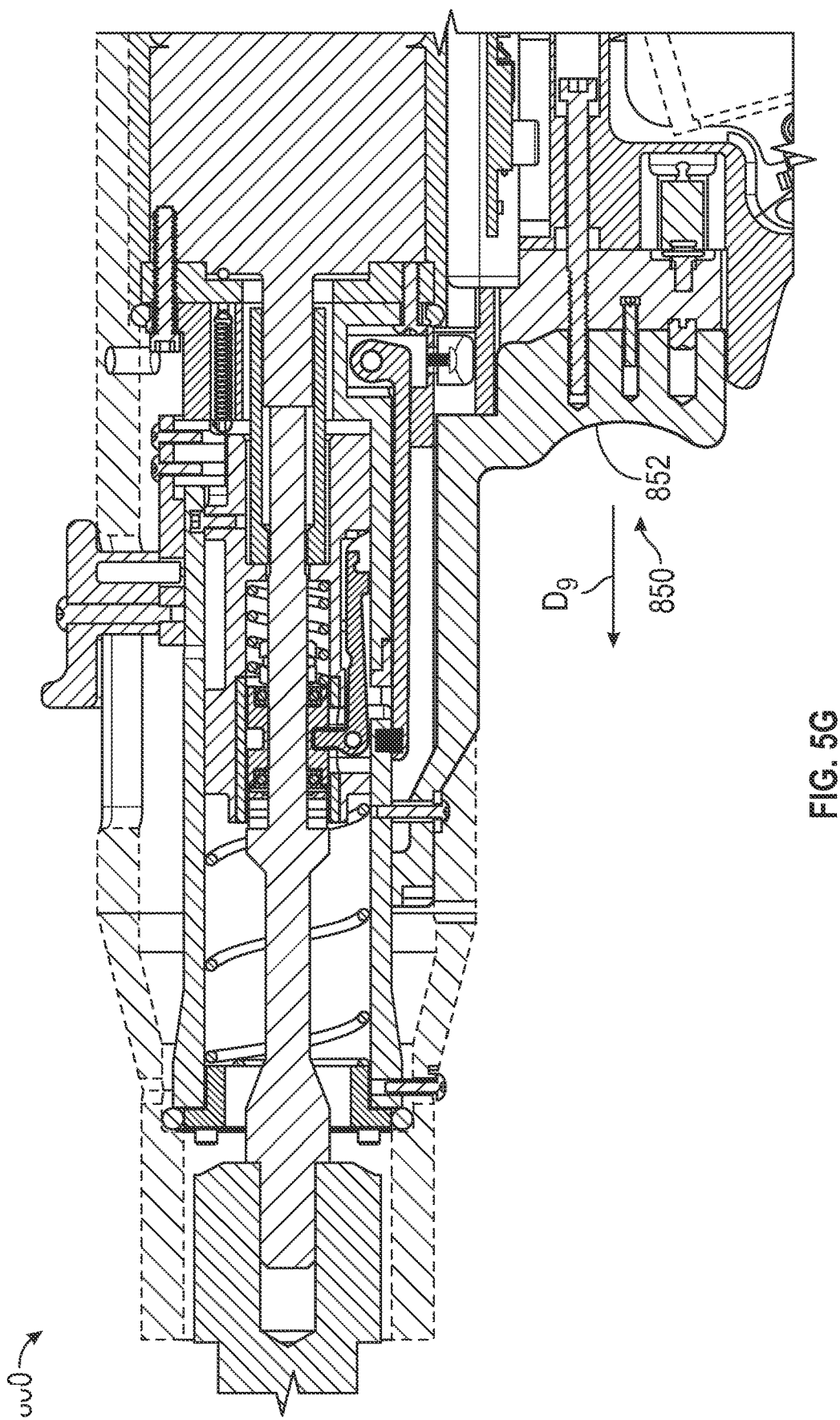

Referring to FIG. 5G, the clinician can subsequently release the trigger mechanism 850 so that the trigger slider 852 moves distally relative to the rest of the device 800 (e.g., along direction $D_9$).

Figure 5H:
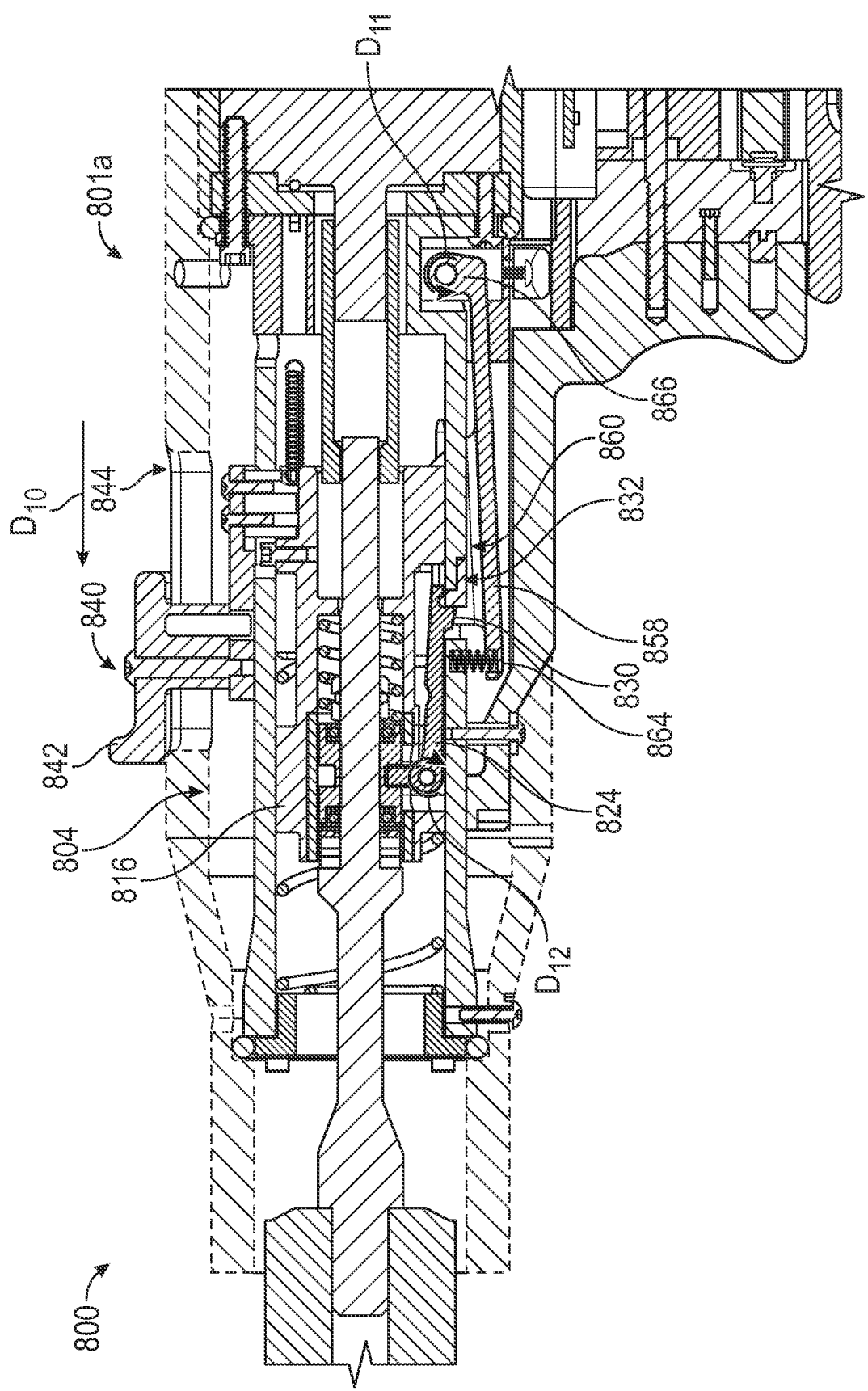

Referring to FIG. 5H, the clinician can subsequently place the device 800 back into the initial operating state via the reset mechanism 840. The reset mechanism 840 can include a reset slider 842 that is movable relative to the body portion 801a of the device 800 (e.g., within a slide channel 844). The reset slider 842 can be coupled to the slide assembly 816 so that movement of the reset slider 842 produces a corresponding movement of the slide assembly 816, and vice-versa. As a result, when the clinician moves the reset slider 842 distally (e.g., along direction $D_{10}$), the slide assembly 816 moves distally along with the reset slider 842. The drill bit 802 can move distally along with the slide assembly 816 into its initial un-retracted position.

As the slide assembly 816 moves distally, the locking element 824 also moves proximally within the channel 860 of the trigger lever 858 until the protrusion 830 is aligned with the aperture 832. At this point, the force applied to the trigger lever 858 by the third spring element 864 can cause the trigger lever 858 to move downwards and/or rotate counterclockwise around pivot portion 866 (e.g., along direction DO. Thus, the trigger lever 858 can push the locking element 824 downwards and/or clockwise (e.g., along direction $D_{12}$) so that the protrusion 830 moves into the aperture 832, thereby returning the locking element 824 to the locked configuration and resetting the retraction mechanism 804.

Figure 5I:
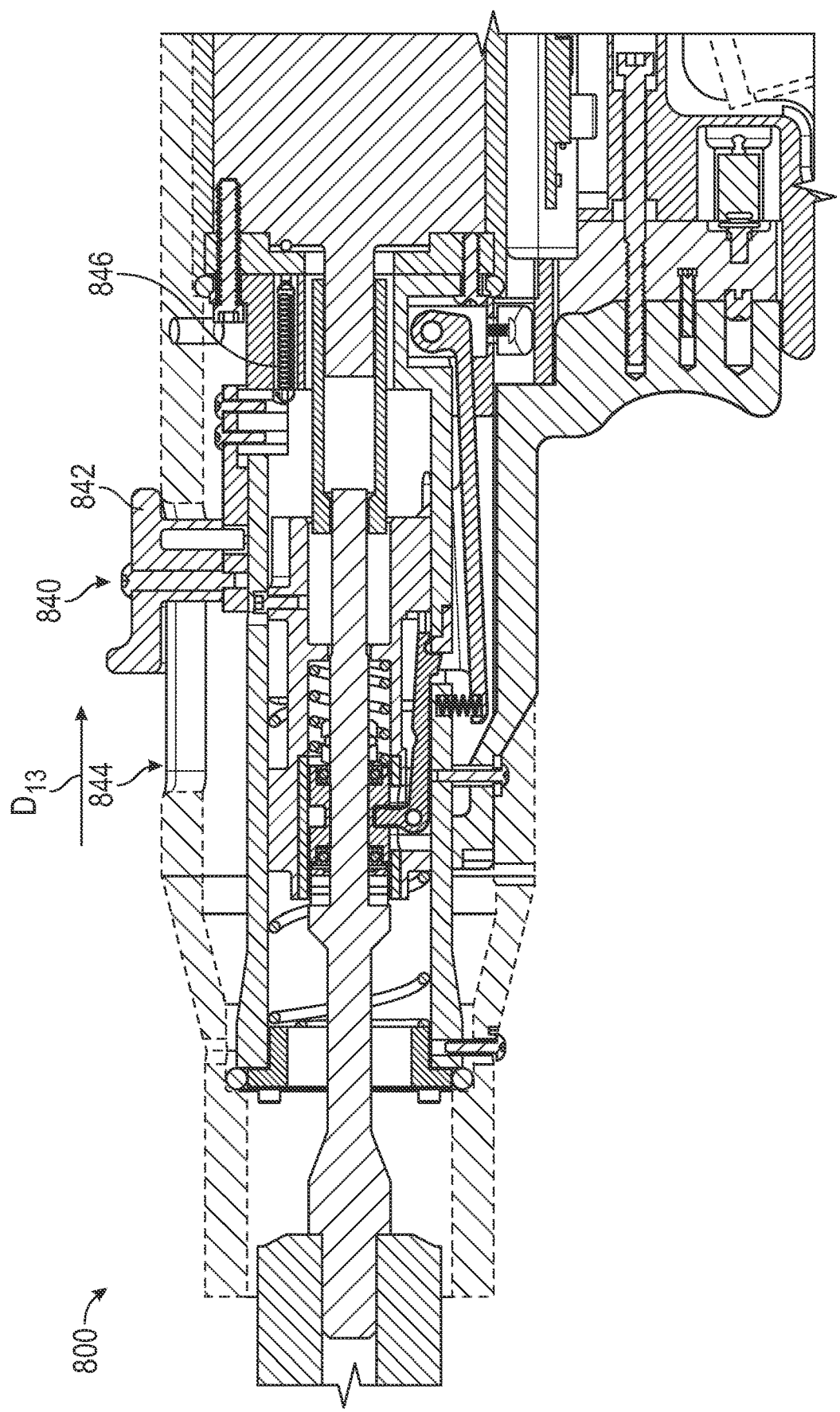

Referring to FIG. 5I, the reset slider 842 can be coupled to a fourth spring element 846. When the clinician releases the reset slider 842, the fourth spring element 846 can pull the reset slider 842 proximally within the slide channel 844

(e.g., along direction $D_{13}$) to return it to its initial position. The device 800 is then ready for use in another drilling procedure.

Figure 6A:
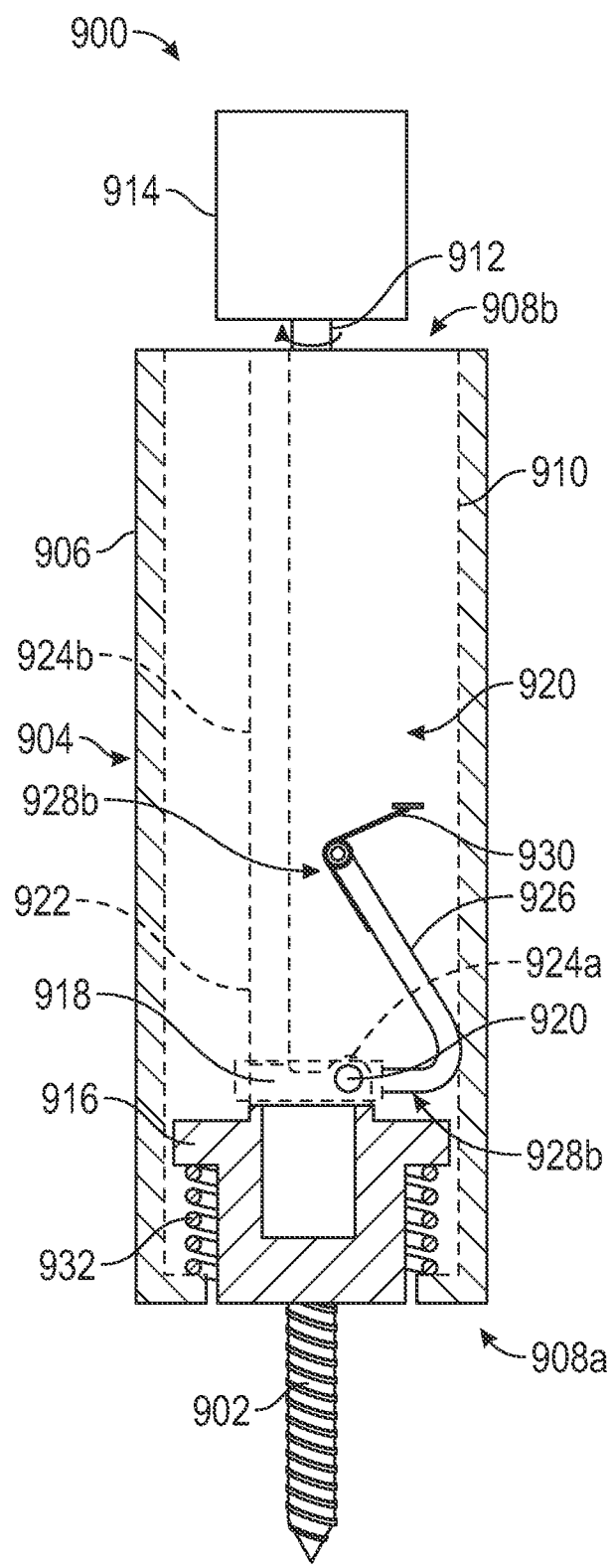
FIGS. 6A-6B are partially schematic cross-sectional views of a surgical drilling device configured in accordance with embodiments of the present technology.
Figure 6B:
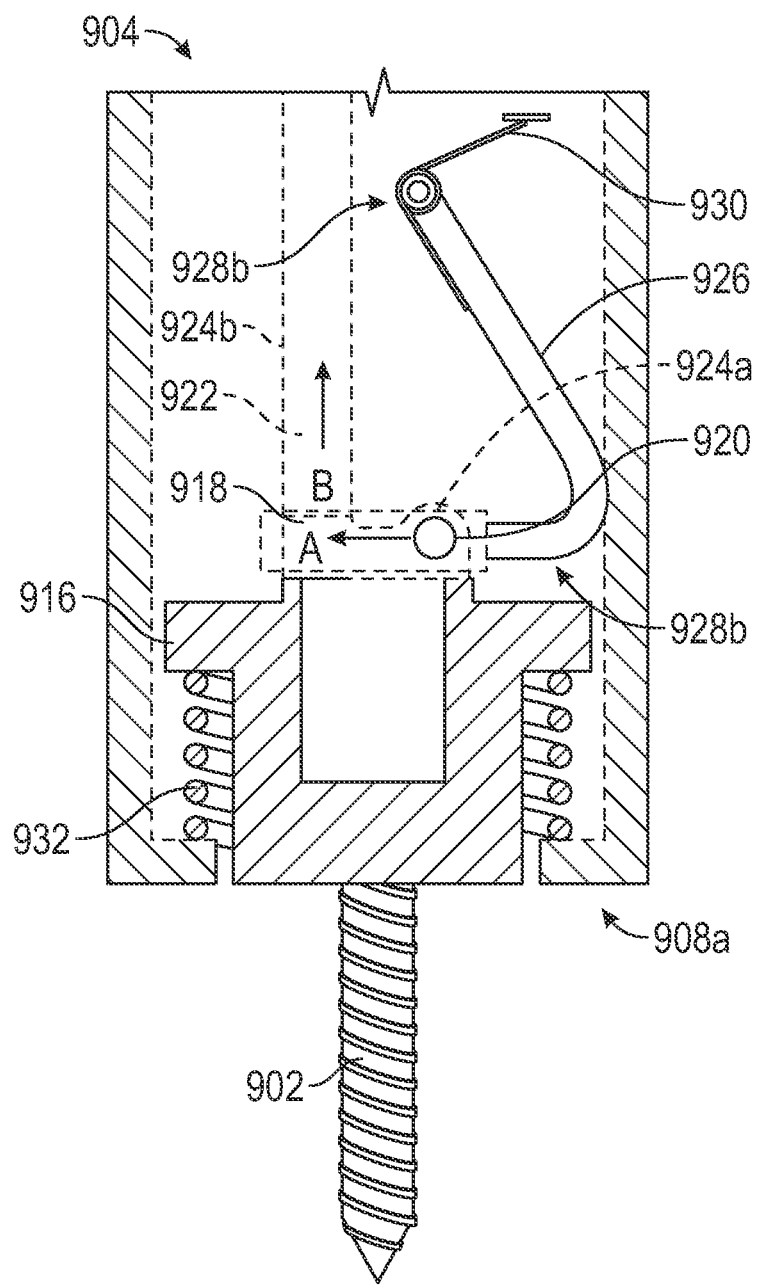

FIGS. 6A and 6B are partially schematic side cross-sectional views of a surgical drilling device 900 ("device 900") configured in accordance with embodiments of the present technology.

Referring first to FIG. 6A, the device 900 includes a retraction mechanism 904 operably coupled to a drill bit 902 that is configured to drill into a tissue (e.g., a skull). The drill bit 902 can be configured similarly to the drill bit 502 of FIG. 3. The retraction mechanism 904 includes a housing 906 having a distal end portion 908a, a proximal end portion 908b, and an internal cavity 910 (also referred to as a "chamber"). The drill bit 902 can be located external to the housing 906 at or near the distal end portion 908a. In some embodiments, the drill bit 902 can be coupled to an elongated shaft 912 that extends through the internal cavity 910 of the housing 906 from the distal end portion 908a to the proximal end portion 908b (the shaft 912 is truncated in FIG. 6A for clarity). The elongated shaft 912 can be a drive shaft that operably couples the drill bit 902 to a motor 914 that actuates the rotation of the drill bit 902. In some embodiments, the elongated shaft 912 can be a splined motor shaft that transmits torque from the motor 914 to the drill bit 902 while allowing for movement of the drill bit 902 along the longitudinal axis of the device 900. In the illustrated embodiment, the motor 914 is positioned external to the housing 906 at or near the proximal end portion 908b. In other embodiments, the motor 914 can be positioned within the internal cavity 910 of the housing, such as at or near the proximal end portion 908b.

The retraction mechanism 904 can further include a drill collar 916 positioned within the internal cavity 910 of the housing 906. The drill collar 916 can move longitudinally within the housing 906, e.g., in a proximal direction and/or in a distal direction. The drill collar 916 can be coupled to the drill bit 902 such that the drill bit 902 moves in concert with the drill collar 916. For example, the drill bit 902 can move proximally when the drill collar 916 moves proximally and can move distally when the drill collar 916 moves distally.

The retraction mechanism 904 can also include a cam ring 918 within the housing 906. The cam ring 918 can be operably coupled to the drill collar 916 such that the drill collar 916 (and thus, the drill bit 902) moves proximally and/or distally in concert with the cam ring 918. The cam ring 918 can also be configured to rotate within the housing 906 (e.g., around the central longitudinal axis of the device 900). In some embodiments, the cam ring 918 is not torsionally coupled to the motor 914 so that the rotation of the cam ring 918 is independent of the rotation of the motor 914, drill collar 916, and drill bit 902 (e.g., the cam ring 918 does not spin during drilling).

In some embodiments, the cam ring 918 includes a pin 920 received within a track 922 in the housing 906. The positioning of the pin 920 within the track 922 can control whether the cam ring 918 (and thus, the retraction mechanism 904) is locked or unlocked. For example, the track 922 can include a first section 924a extending along a circumferential direction, and a second section 924b extending along a longitudinal direction. When the pin 920 is in the first section 924a ("locked configuration"), the engagement between the pin 920 and the housing 906 can prevent the cam ring 918 (and thus, the drill collar 916 and drill bit 902) from moving in a proximal direction. When the pin 920 is in the second section 924b ("unlocked configuration"), the pin 920 can move freely in a proximal direction. Accordingly, the cam ring 918 (and thus, the drill collar 916 and drill bit 902) can also move proximally within the housing 906 to retract the drill bit 902.

The cam ring 918 can initially be in the locked configuration with the pin 920 located in the first section 924a of the track 922. When the drill bit 902 is in contact with a target tissue (e.g., bone), the force against the drill bit 902 can be transmitted to the drill collar 916. The drill collar 916 can in turn apply a force against the pin 920 to hold it within the first section 924a of the track 922 and prevent rotation of the cam ring 918. Accordingly, the drill bit 902 can remain in an unretracted state for drilling.

Referring next to FIG. 6B, when the drill bit 902 breaks partially or fully through the target tissue, the opposing force against the drill bit 902 can decrease or disappear altogether. As a result, the force applied by the drill bit 902 to the drill collar 916 can also decrease and can trigger the cam ring 918 to automatically move into the unlocked configuration. For example, the cam ring 918 can be coupled to a lever arm 926 having a first end portion 928a and a second end portion 928b. The first end portion 928a can be coupled to the cam ring 918, and the second end portion 928b can be coupled to a spring 930 (e.g., a torsion spring) within the housing 906. The spring 930 can apply a biasing force to the lever arm 926 to rotate the cam ring 918. When the force applied against the drill collar 916 decreases, the drill collar 916 no longer prevents rotation of the cam ring 918. Accordingly, the biasing force applied to the lever arm 926 via the spring 930 can rotate the cam ring 918, which in turn causes the pin 920 to slide within the first section 924a of the track 922 (e.g., along the direction indicated by arrow A) and into the second section 924b of the track 922, thus unlocking the cam ring 918.

Once the cam ring 918 is in the unlocked configuration, the drill collar 916 can be automatically displaced longitudinally towards the proximal end portion 908b of the housing 906 to retract the drill bit 902. In the illustrated embodiment, for example, the retraction mechanism 904 includes a retraction spring 932 within the housing 906 (e.g., at or near the distal end portion 908a). The retraction spring 932 can be coupled to or otherwise engage the drill collar 916. In some embodiments, when the cam ring 918 is in the locked configuration, the drill collar 916 applies a force to the retraction spring 932 to deform it from its resting or unloaded length into a loaded length (e.g., a compressed or elongated length). For example, in the illustrated embodiment, the retraction spring 932 is positioned distally to the drill collar 916 and is compressed by the drill collar 916 to a length less than its resting or unloaded length. As a result, when the cam ring 918 is unlocked, the retraction spring 932 can expand towards its resting or unloaded length, thereby applying a proximally-directed force against the drill collar 916 and cam ring 918. Because the pin 920 of the cam ring 918 is located in the second section 924b of the track 922, the pin 920 and cam ring 918 can slide in a proximal direction (e.g., in the direction indicated by arrow B), thus allowing the drill collar 916 to move in a proximal direction and resulting in retraction of the drill bit 902. In alternative embodiments, the retraction spring 932 can be positioned proximally to the drill collar 916 such that when the cam ring 918 is in the locked configuration, the retraction spring 932 is elongated by the drill collar 916 to a length greater than its resting or unloaded length. When the cam ring 918 is in the unlocked configuration, the retraction spring 932 can contract towards its resting or unloaded length to displace the drill collar 916 proximally to retract the drill bit 902.

In some embodiments, the drill bit 902 is retracted entirely into the housing 906. In other embodiments, the drill bit 902 can be retracted only partially into the housing 906 or remain entirely outside the housing 906. The retraction distance (e.g., the distance between the initial position of the drill bit 902 and the retracted position of the drill bit 902) can be varied as desired. For example, the retraction distance can be at least 0.5 mm, 1 mm, 2 mm, 3 mm, 4 mm, 5 mm, 10 mm, 15 mm, 20 mm, 25 mm, and/or any distance therebetween. In some embodiments, the device 900 is configured to reduce or minimize the plunge distance of the drill bit 902 (e.g., the maximum distance the drill bit 502 travels past the target tissue before being retracted). For example, the device 900 can be configured to provide a plunge distance of no more than 10 mm, 9 mm, 8 mm, 7 mm, 6 mm, 5 mm, 4 mm, 3 mm, 2 mm, 1 mm, 0.5 mm, 0.2 mm, 0.1 mm, and/or any distance therebetween.

In some embodiments, the device 900 is configured for use as a single-use disposable device. In other embodiments, certain device components are reusable (e.g., the drill bit 902 and/or the motor 914) while other device components are intended to be single-use (e.g., the retraction mechanism 504). Optionally, the entire device 900 can be configured to be reusable. In such embodiments, the device 900 can be compatible with cleaning and sterilization processes known to those of skill in the art.

Figure 7A:
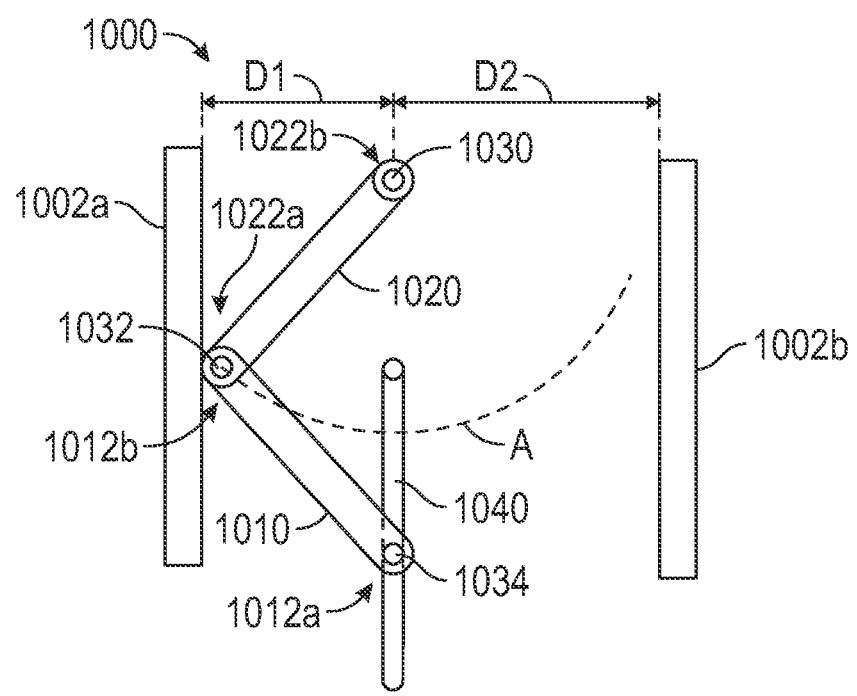
FIGS. 7A-7C are side views of a retraction mechanism for use in a surgical drilling device configured in accordance with embodiments of the present technology.
Figure 7B:
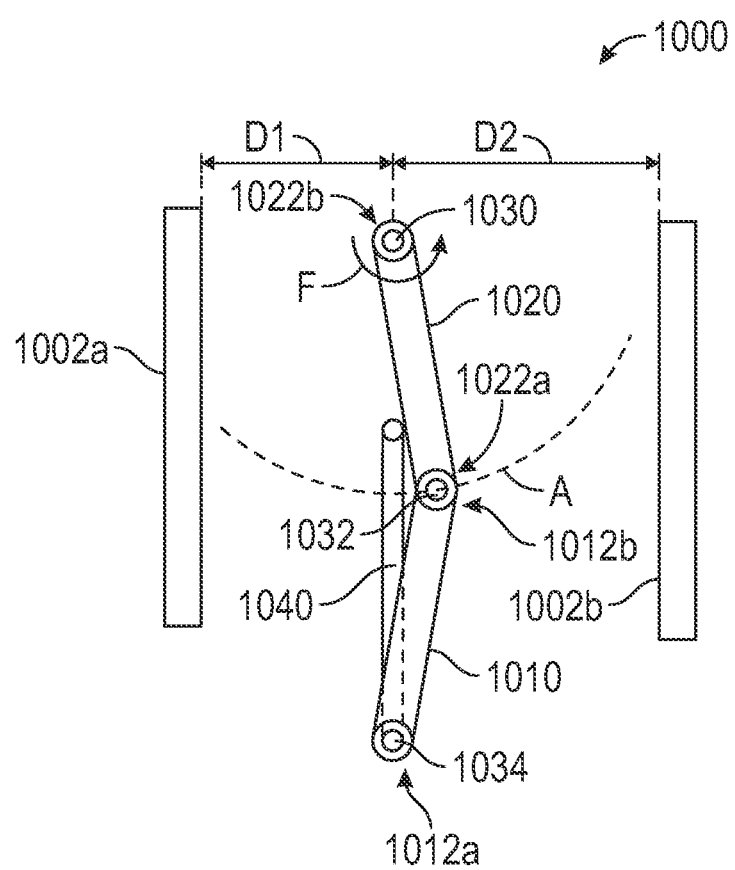
Figure 7C:
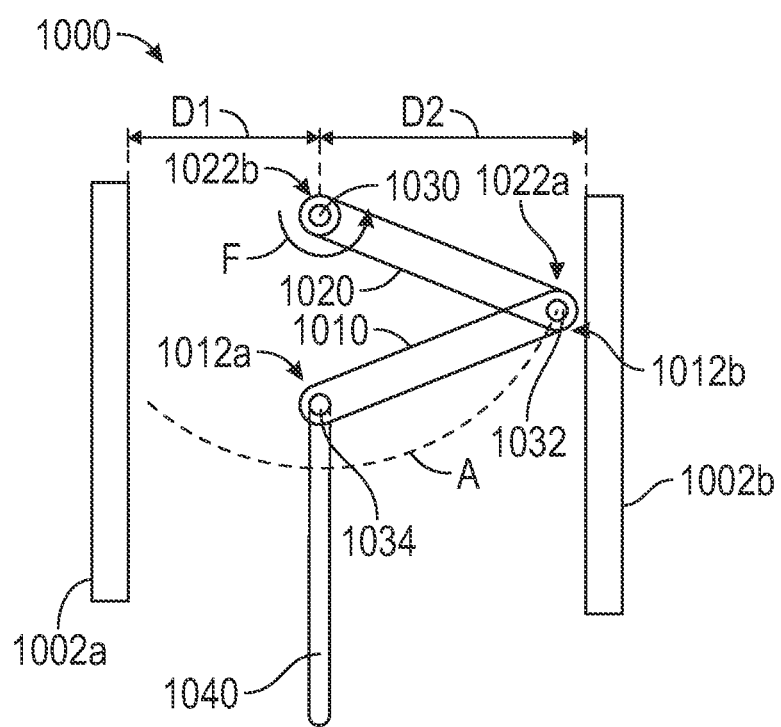

FIGS. 7A-7C are side views of a retraction mechanism 1000 for use in a surgical drilling device (e.g., the device 500 of FIG. 3) configured in accordance with embodiments of the present technology. Specifically, FIG. 7A illustrates the retraction mechanism 1000 in a locked configuration, FIG. 7B illustrates the retraction mechanism 1000 in an intermediate configuration, and FIG. 7C illustrates the retraction mechanism 1000 in an unlocked configuration.

Referring first to FIG. 7A, the retraction mechanism 1000 can be positioned between a first wall 1002a (e.g., a first side or surface of a housing, such as the housing 506 of FIG. 3) and a second wall 1002b (e.g., a second side or surface of a housing, such as the housing 506 of FIG. 3). The retraction mechanism 1000 can include a plurality of links (e.g., a first link 1010 and a second link 1020) positioned at least partially between the first wall 1002a and the second wall 1002b. The first and second links 1010, 1020 can be elongate structures having respective distal end portions 1012a, 1022a and proximal end portions 1012b, 1022b.

In the illustrated embodiment, the proximal end portion 1022b of the second link 1020 is pivotally fixed by a first pivot 1030. The first pivot 1030 can prevent the proximal end portion 1022b of the second link 1020 from moving in a direction proximal, distal, lateral, and/or a combination thereof relative to the first and second walls 1002a-b. The second link 1020 can rotate about the first pivot 1030 along an arc A relative to the first and second walls 1002a-b.

The first link 1010 can be coupled to the second link 1020 so that movement of the second link 1020 (e.g., rotation around the first pivot 1030) produces a corresponding movement of the first link 1010 (e.g., rotation and/or translation). In the illustrated embodiment, for example, the distal end portion 1022a of the second link 1020 is pivotally coupled to the proximal end portion 1012b of the first link 1010 by a second pivot 1032. The first link 1010 can rotate about the second pivot 1032 relative to the second link 1020.

The retraction mechanism 1000 can further include a slot or track 1040 positioned between the first and second walls 1002a-b. The slot 1040 can extend along the longitudinal axis of the retraction mechanism 1000, and can be parallel or substantially parallel to the first and second walls 1002a-b. As shown in FIG. 7A, the slot 1040 can be aligned with the first pivot 1030. The distal end portion 1012a of the first link 1010 can be coupled to the slot 1040 by a third pivot 1034. As such, the interaction between the third pivot 1034 and the slot 1040 can limit the distal end portion 1012a of the first link 1010 to a generally longitudinal motion (e.g., in a proximal and/or distal direction along the slot 1040).

The retraction mechanism 1000 can further include a drill bit (not shown for purposes of clarity) operably coupled to the distal end portion 1012a of the first link 1010. The drill bit can drill into a tissue (e.g., a skull), and can be generally similar to or the same as the drill bit 502 of FIG. 3. The drill bit can move in concert with the distal end portion 1012a of the first link 1010, e.g., the drill bit moves proximally and/or distally with the motion of the distal end portion 1012a.

In some embodiments, the first pivot 1030 and/or slot 1040 are offset from the central longitudinal axis of the retraction mechanism 1000, such that the first pivot 1030 and slot 1040 are closer to one wall (e.g., first wall 1002a) than the other wall (e.g., second wall 1002b). The first pivot 1030 and/or the slot 1040 can be a first distance D1 from the first wall 1002a and a second distance D2 from the second wall 1002b. In the illustrated embodiment, the first distance D1 is greater than the second distance D2. In other embodiments, the second distance D2 can be greater than the first distance D1. The distances D1 and D2 can be selected based on the size and/or desired range of motion of the first and second links 1010, 1020. For example, the distance D1 can be less than the length of the second link 1020 to produce mechanical interference when the second link 1020 is rotated towards the first wall 1002a, as described further below. The distance D2 can be greater than the length of the second link 1020 so there is little or no mechanical interference when the second link 1020 is rotated toward the second wall 1002b.

As shown in FIG. 7A, when the retraction mechanism 1000 is in the locked configuration, the second link 1020 can be rotated around the first pivot 1030 in a clockwise direction toward the first wall 1002a, such that the distal end portion 1022a of the second link 1020 and/or the proximal end portion 1012b of the first link 1010 contact the first wall 1002a. This contact can produce mechanical interference that constrains the rotation of the second link 1020, e.g., the second link 1020 can be prevented from rotating further in a clockwise direction. The retraction mechanism 1000 can be maintained in this locked configuration by the force from the drill bit contacting a target tissue (e.g., bone). The force against the drill bit can be transmitted to the first link 1010. The first link 1010 can in turn apply a force against the second link 1020 that pushes the second link 1020 in a clockwise direction toward the first wall 1002a and/or prevents the second link 1020 from rotating counterclockwise away from the first wall 1002a. Accordingly, the force can hold the proximal end portion 1012b and/or distal end portion 1022a against the first wall 1002a, thus maintaining the mechanical interference between the second link 1020 and the first wall 1002a. Similarly, the interaction between the first link 1010 and the slot 1040 can limit the rotation and/or translation of the first link 1010. Accordingly, the drill bit can remain in an unretracted state for drilling.

Referring next to FIG. 7B, when the drill bit breaks partially or fully through the target tissue, the retraction mechanism 1000 can be configured to automatically switch from the locked configuration to an intermediate configuration based on the amount of force transmitted by the drill bit to the first and second links 1010, 1020. For example, when the force falls below a threshold and/or reaches zero (e.g., indicating that the drill bit has penetrated at least partially through the target tissue), the first and second links 1010, 1020 can automatically move to the intermediate configuration shown in FIG. 7B. In some embodiments, the first pivot 1030 includes a spring element (e.g., a torsion spring—omitted for purposes of clarity) configured to apply a torsional force (e.g., in a direction indicated by arrow F) to rotationally bias the second link 1020 in a counterclockwise direction away from the first wall 1002a and/or toward the second wall 1002b.

When the drill bit is contacting the target tissue, the force against the drill bit can counteract the torsional force F applied to the second link 1020 such that the retraction mechanism 1000 can remain in the locked configuration. However, when the drill bit breaks partially or fully through the target tissue, the opposing forces against the drill bit can decrease or disappear altogether. As a result, the force applied by the drill bit to the first and second links 1010, 1020 can also decrease, and can allow the spring element to expand towards its resting or unloaded configuration. As the torsion spring expands, it can rotate the second link 1020 about the first pivot 1030 (e.g., along arc A) to move the distal end portion 1022a away from the first wall 1002a and in a generally distal direction. The motion of the second link 1020 can cause a corresponding movement of the first link 1010 relative to the slot 1040, such that the distal end portion 1012a can move in a generally distal direction defined by the slot 1040.

In the intermediate configuration, the distal end portions 1012a, 1022a of the first and second links 1010, 1020 can be in a position generally distal to their position in the locked configuration. This distal displacement can correspond to a plunge distance of the drill bit.

Referring next to FIG. 7C, the retraction mechanism 1000 can be further configured to automatically move from the intermediate configuration to the unlocked configuration to retract the drill bit. For example, the torsional force F can cause the second link 1020 to rotate further along arc A (e.g., in a counterclockwise direction and/or toward the second wall 1002b) to move the distal end portion 1022a of the second link 1020 in a position generally proximal to its position in the locked and/or intermediate configuration. In some embodiments, because the distance D2 is greater than the length of the second link 1020, the second link 1020 can rotate in the counterclockwise direction with little or no mechanical interference. The proximal motion of the distal end portion 1022a of the second link 1020 can also move (e.g., rotate and/or translate) the first link 1010 relative to the second link 1020 and the slot 1040. This can move the distal end portion 1012a of the first link 1010 along the slot 1040 in a direction generally proximal to its position in the locked and/or intermediate configurations. The proximal motion of the distal end portion 1012a of the first link 1010 can move the drill bit (not shown) in a proximal direction, and result in the retraction of the drill bit.

The retraction distance provided by the retraction mechanism 1000 can be at least 0.5 mm, 1 mm, 2 mm, 3 mm, 4 mm, 5 mm, 10 mm, 15 mm, 20 mm, 25 mm, and/or any distance therebetween. In some embodiments, the retraction mechanism 1000 is configured to reduce or minimize the plunge distance of the drill bit (e.g., the maximum distance the drill bit travels past the target tissue before being retracted). For example, the retraction mechanism 1000 can be configured to provide a plunge distance of no more than 10 mm, 9 mm, 8 mm, 7 mm, 6 mm, 5 mm, 4 mm, 3 mm, 2 mm, 1 mm, 0.5 mm, 0.2 mm, 0.1 mm, and/or any distance therebetween.

Figure 8:
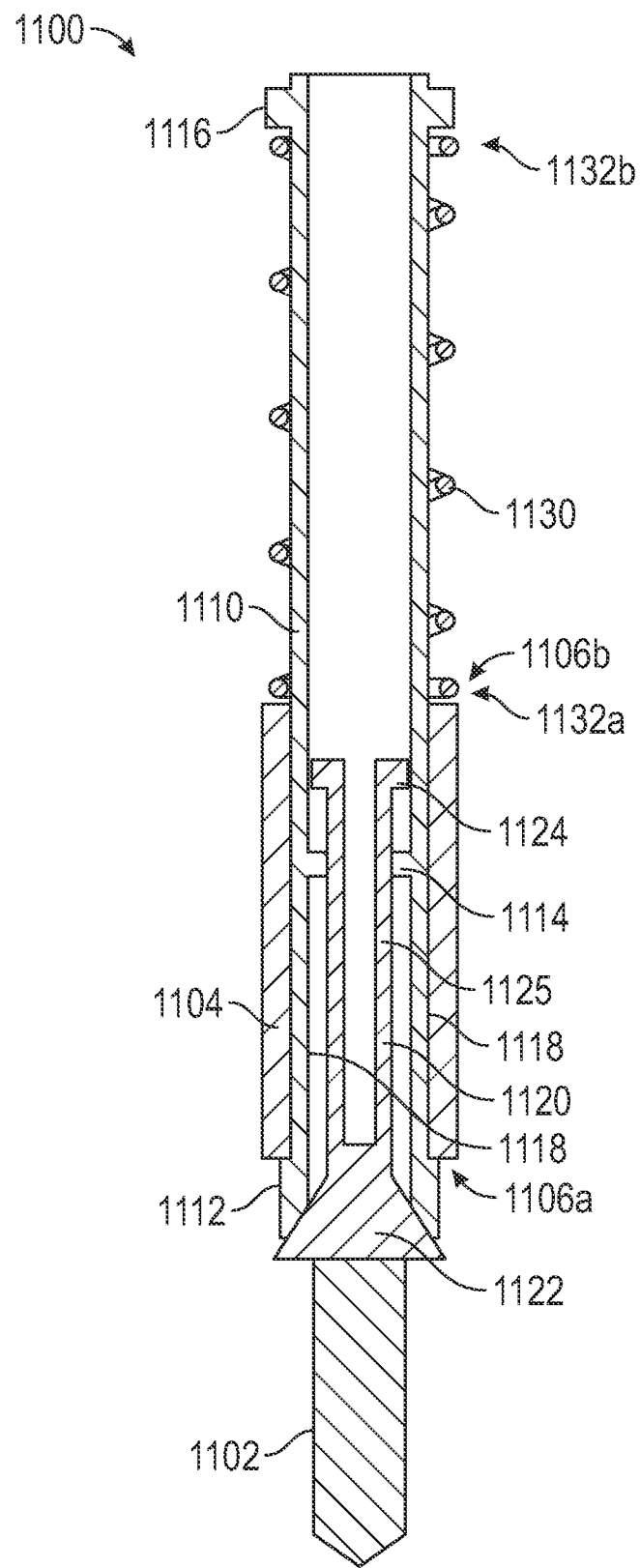
FIG. 8 is a cross-sectional view of a retraction mechanism for use in a surgical drilling device configured in accordance with embodiments of the present technology.

FIG. 8 is a cross-sectional view of a retraction mechanism 1100 for use in a surgical drilling device (e.g., the device 500 of FIG. 3) configured in accordance with embodiments of the present technology. The retraction mechanism 1100 includes a drill bit 1102 configured to drill into a tissue (e.g., a skull). The drill bit 1102 can be the same or similar as the drill bit 502 of FIG. 3.

The retraction mechanism 1100 further includes a housing 1104 having a distal end region 1106a and a proximal end region 1106b. The housing 1104 can at least partially contain an outer collet 1110 and an inner collet 1120. The outer collet 1110 can be an elongate, hollow structure including a plurality of distal tabs 1112, a plurality of interior tabs 1114, and a plurality of proximal tabs 1116. As shown in FIG. 8, the outer collet 1110 can include a set of flexible distal arms 1118, and the distal tabs 1112 can be located on the flexible distal arms 1118. The inner collet 1120 can have an elongate structure positioned at least partially within the outer collet 1110. The inner collet 1120 can include a distal conical region 1122, a plurality of proximal tabs 1124, and an elongate shaft 1125 connecting the conical region 1122 to the proximal tabs 1124. The drill bit 1102 can be operably coupled to a distal end of the conical region 1122.

The retraction mechanism 1100 can further include a spring element 1130 positioned distal to the housing 1104 and axially around at least part of the outer collet 1110. The spring element 1132 can include a distal end portion 1132a coupled to the proximal end region 1106b of the housing 1104, and a proximal end portion 1132b coupled to the proximal tabs 1116 of the outer collet 1110. The spring element 1132 can be configured to retract the outer collet 1110, inner collet 1120, and drill bit 1102 relative to the housing 1104, as described in further detail below.

The retraction mechanism 1100 can be configured to automatically switch from a locked configuration (e.g., FIG. 8) to an unlocked configuration (not shown) based on the amount of force applied by the drill bit 1102 to the inner collet 1120. As shown in FIG. 8, when the retraction mechanism 1100 is in the locked configuration, the conical region 1122 of the inner collet 1120 can engage the flexible distal arms 1118 of the outer collet 1110 and push the flexible distal arms 1118 outward. Accordingly, the distal tabs 1112 can be outwardly biased and can engage the housing 1104 (e.g., the distal end region 1106a of the housing 1104) to prevent the outer collet 1110, inner collet 1120, and drill bit 1102 from moving in a proximal direction relative to the housing 1104. In the locked configuration, the spring element 1130 can be maintained at a compressed (e.g., stressed, loaded) length due to the decreased distance between the proximal tabs 1116 and the housing 1104.

In the illustrated embodiment, when the drill bit 1102 is contacting and/or drilling into a relatively hard tissue (e.g., bone), the tissue applies a proximally-directed force against the drill bit 1102 that opposes the distally-directed force applied by the drill bit 1102 to the tissue. The drill bit 1102 can transmit at least some or all of the counteracting force to the inner collet 1120 (e.g., at least 50%, 75%, 90%, 95%, 99%, or any amount of the counteracting force therebetween). In some embodiments, the drill bit 1102 transmits some or all of the force to the inner collet 1120, thus pushing the conical region 1122 of the inner collet 1120 proximally against the flexible distal arms 1118 of the outer collet 1110. Accordingly, the flexible distal arms 1118 can remain biased outwards to maintain the engagement between the distal tabs 1112 and the housing 1104, so that the drill bit 1102 remains unretracted.

When the drill bit 1102 breaks partially or fully through the target tissue, the opposing force against the drill bit 1102 can decrease or disappear altogether. As a result, the force applied by the drill bit 1102 to the inner collet 1120 can also decrease, triggering the inner collet 1120 to automatically move into the unlocked configuration (not shown). In some embodiments, when the force applied by the drill bit 1102 against the inner collet 1120 decreases, the inner collet 1120 moves distally relative to the housing 1104 and outer collet 1110. The distal movement can cause the conical region 1122 to disengage from the flexible distal arms 1118 of the outer collet 1110. The flexible distal arms 1118 can be biased to move inwards away from the housing 1104 and toward the narrower elongate shaft 1125 of the inner collet 1120. The inward movement of the flexible distal arms 1118 can disengage the distal tabs 1112 from the housing 1104 and allow the outer collet 1110 to move proximally relative to the housing 1104.

Once the distal tabs 1112 have disengaged from the housing 1104, the spring element 1130 can revert from its compressed length back to a resting or unloaded length. Accordingly, the spring element 1130 can push against the proximal tabs 1116 to move the outer collet 1110 in a proximal direction relative to the housing 1104. As the outer collet 1110 moves proximally, the interior tabs 1114 of the outer collet 1110 can engage the corresponding proximal tabs 1124 of the inner collet 1120, thus moving the inner collet 1120 in a proximal direction and retracting the drill bit 1102.

In some embodiments, the drill bit 1102 is retracted entirely into the housing 1104. In other embodiments, the drill bit 1102 can be retracted only partially into the housing 1104 or remain entirely outside the housing 1104. For example, the retraction distance can be at least 0.5 mm, 1 mm, 2 mm, 3 mm, 4 mm, 5 mm, 10 mm, 15 mm, 20 mm, 25 mm, and/or any distance therebetween.

Figure 9E:
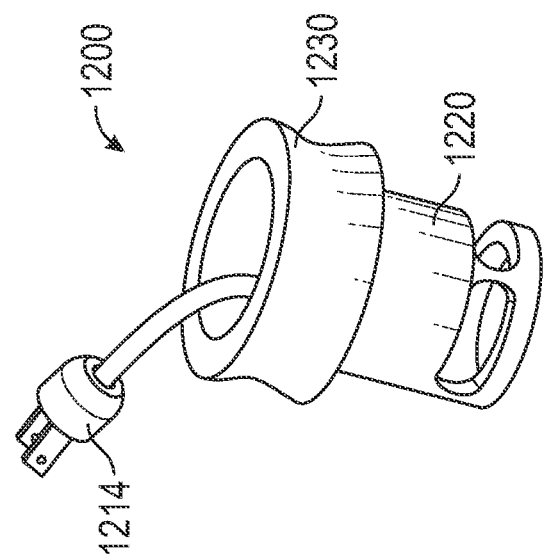
Figure 9D:
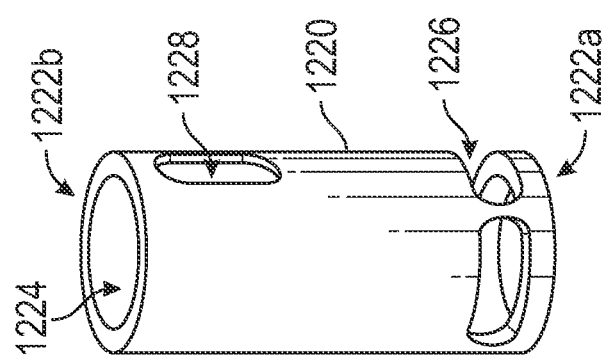

FIGS. 9A-9E illustrate a retraction mechanism 1200 for use in a surgical drilling device configured in accordance with embodiments of the present technology. FIG. 9A is a side partial cross-sectional view of the retraction mechanism 1200. FIG. 9B is a perspective view of a drill assembly 1203 of the retraction mechanism 1200 of FIG. 9A. FIG. 9C is an exploded isometric view of a clutch assembly 1205 of the retraction mechanism 1200 of FIG. 9A. FIG. 9D is a perspective view of a chassis or housing 1220 of the retraction mechanism 1200 of FIG. 9A. FIG. 9E is a perspective view of the housing 1220 together with a plunger 1230 of the retraction mechanism 1200 of FIG. 9A.

Referring first to FIG. 9A, the retraction mechanism 1200 includes a drill assembly 1203 and a clutch assembly 1205. The drill assembly 1203 can be coupled to, and positioned distally of, the clutch assembly 1205. The retraction mechanism 1200 can further include a housing 1220 that can at least partially contain the drill assembly 1203 and/or the clutch assembly 1205. The retraction mechanism 1200 can further include first and second spring elements 1270, 1280. The first spring element 1270 can be positioned between a distal end portion 1222a of the housing 1220 and a portion of the drill assembly 1203. The second spring element 1280 can be positioned at least partially around the first spring element 1270 and between a distal end portion 1222a of the housing 1220 and a distal end of the clutch assembly 1205. In the illustrated embodiment, the retraction mechanism 1200 further includes a plunger or cap 1230 at least partially covering a proximal end portion 1222b of the housing 1220.

Referring next to FIGS. 9A and 9B together, the drill assembly 1203 can include a drill bit 1202, a drill motor 1210, and one or more motor anchors 1212. The drill bit 1202 can be configured to drill into a target tissue 1201 (e.g., a skull), and can be operably coupled to the motor 1210. The motor anchors 1212 (e.g., posts, pins, etc.) can be coupled to and protrude from the outer surface of the motor 1210. The motor anchors 1212 can be configured to engage the clutch assembly 1205 to restrict the drill assembly 1203 from moving proximally along axis E (FIG. 9A). The interaction between the drill assembly 1203 and the clutch assembly 1205 can be used to control the retraction of the drill bit 1202, as described in greater detail below.

Referring next to FIGS. 9A and 9C together, the clutch assembly 1205 can include a clutch anchor element 1240, a clutch ring 1250, and a clutch spring 1260. The clutch anchor element 1240 can be a circular ring including one or more anchor tracks 1242 (e.g., grooves or channels) on the inner surface of the clutch anchor element 1240. Each of the anchor tracks 1242 can be configured to receive a corresponding one of the motor anchors 1212. The clutch anchor element 1240 can further include an aperture 1244 that can be configured to receive the drill assembly 1203. As described in greater detail below, the interaction between the anchor tracks 1242, the aperture 1244, and the drill assembly 1203 can contribute to controlling the retraction of the drill bit 1202. The clutch anchor element 1240 can further include a plurality of clutch anchors 1246. The clutch anchors 1246 can be configured to engage the housing 1220 of the retraction mechanism 1200 to control the traction of the drill bit 1202, as described in greater detail below.

The clutch assembly 1205 further includes a clutch ring 1250 coupled to the clutch anchor element 1240 via the clutch spring 1260. In the illustrated embodiment, the clutch ring 1250 is positioned distally from the clutch anchor element 1240. The clutch ring 1250 can be a circular structure including one or more ring tracks 1252 (e.g., grooves or channels) on the inner surface of the clutch ring 1250. Each ring track 1252 can correspond to a respective anchor track 1242 and be configured to receive a corresponding motor anchor 1212. The clutch ring 1250 can further include an aperture 1254 that can be aligned (e.g., vertically) with the aperture 1244 of the clutch anchor element and/or configured to receive the drill assembly 1203.

The clutch ring 1250 can further include one or more distal recesses 1256. The recesses 1256 can be notches, cutouts, indentations, etc., formed in the distal surface of the clutch ring 1250. Each one of the distal recesses 1256 can be configured to receive one of the motor anchors 1212 of the drill assembly 1203. As best seen in FIG. 9C, the distal recesses 1256 can be offset (e.g., at a different circumferential location) from the ring tracks 1252. The offset between the distal recesses 1256 and ring tracks 1252 can be at least 5, 10, 15, 20, 25, 30, 45, 60, or 90 degrees, and/or any amount therebetween.

The clutch ring 1250 can be configured to rotate (e.g., about axis E—FIG. 9A) relative to the clutch anchor element 1240 and/or the housing 1220. For example, the clutch ring 1250 can rotate at least 5, 10, 15, 20, 25, 30, 45, 60, or 90 degrees, and/or any amount therebetween relative to the clutch anchor element 1240. Rotating the clutch ring 1250 can cause at least one feature of the clutch ring 1250 (e.g., the ring tracks 1252) to be aligned (e.g., vertically) with a corresponding at least one feature of the clutch anchor element 1240 (e.g., the anchor tracks 1242). The rotational position of the clutch ring 1250 can control whether the retraction mechanism 1200 is in a locked configuration or an unlocked configuration, as described in greater detail below.

The clutch assembly 1205 can further include a clutch spring 1260 coupled to and positioned between the clutch ring 1250 and the clutch anchor element 1240. In the illustrated embodiment, the clutch spring 1260 is a torsion spring configured to apply a torsional force about axis E to the clutch ring 1250. The clutch spring 1260 can rotationally bias the clutch ring 1250 to an orientation in which the ring tracks 1252 are aligned (e.g., vertically) with the anchor tracks 1242.

Referring next to FIGS. 9A and 9D together, the housing 1220 can have a distal end portion 1222a and a proximal end portion 1222b. The housing 1220 can further include an internal cavity 1224 that can at least partially contain the drill assembly 1203 and/or the clutch assembly 1205. The internal cavity 1224 can be configured to allow the drill assembly 1203 to move proximally and/or distally relative to the housing 1220. The distal end portion 1222a of the housing 1220 can include one or more visualization ports 1226 configured to allow observation of the target tissue 1201 while the surgical drilling device is in operation. The housing 1220 can further include one or more slots 1228. Each one of the slots 1228 can correspond to one of the clutch anchors 1246 of the clutch anchor element 1240, such that at least part of the clutch anchors 1246 can pass through and/or be received within the slots 1228. The slots 1228 and clutch anchors 1246 can be configured to rotationally fix the clutch anchor element 1240 relative to the housing 1220. Additionally, the slots 1228 can be configured to allow the clutch anchor element 1240 to move proximally and/or distally relative to the housing 1220.

Referring next to FIGS. 9A and 9E together, the plunger 1230 can cover at least part or all of the proximal end portion 1222b of the housing 1220. The plunger can include or be coupled to a connector 1214 (e.g., a power cable) for coupling the drill assembly 1203 to a power source (not shown). In some embodiments, the plunger 1230 is a separate component that is coupled to the housing 1220 to place the retraction mechanism 1200 into a locked configuration before use. For example, as shown in FIG. 9A, the plunger 1230 can be placed over the housing 1220 and rotated relative to the housing 1220 (e.g., about axis E) so the plunger 1230 engages the clutch assembly 1205. For example, once the plunger 1230 is seated about at least part of the proximal end portion 1222b of the housing 1220, the plunger 1230 can be twisted (e.g., rotated) relative to the housing 1220 (e.g., about axis E) so the plunger 1230 contacts and engages the clutch anchors 1246. The plunger 1230 can then be pushed distally relative to the housing 1220 to apply a distally-directed force to the clutch assembly 1205 and drill assembly 1203. The force can also cause the motor anchors 1212 of the drill assembly 1203 to engage the distal recesses 1256 of the clutch ring 1250 of the clutch assembly 1205. The force can also cause the clutch assembly 1205 and/or the drill assembly 1203 to move distally relative to the housing 1220. In turn, the drill assembly 1203 and clutch assembly 1205 can apply a force to the first and second spring elements 1270, 1280, respectively, to place them into a loaded (e.g., compressed) configuration.

Referring again to FIG. 9A, when the retraction mechanism 1200 is in the locked configuration, the drill assembly 1203 can be engaged with the clutch assembly 1205. The first spring element 1270 can be at a loaded (e.g., compressed) length, and can exert a proximally-directed force against the drill assembly 1203 to keep the motor anchors 1212 of the drill assembly 1203 engaged with the corresponding recesses 1256 of the clutch ring 1250. The interaction between the motor anchors 1212 and the recesses 1256 can counteract the rotational biasing of the clutch spring 1260, preventing the clutch ring 1250 from rotating relative to the clutch anchor element 1240 and preventing the drill assembly 1203 from moving proximally relative to the housing. This can keep the drill bit 1202 in an unretracted state for drilling into a target tissue 1201.

The retraction mechanism 1200 can be configured to automatically switch from the locked configuration to an unlocked configuration (not shown) based on the amount of force applied by the drill assembly 1203 to the clutch assembly 1205. For example, when the drill bit 1202 is contacting and/or drilling into a relatively hard tissue (e.g., bone), the tissue can apply a proximally-directed force against the drill bit 1202 that opposes the distally-directed force applied by the drill bit 1202 to the tissue. The drill bit 1202 can transmit at least some or all of the counteracting force to the clutch ring 1250 (e.g., at least 50%, 75%, 90%, 95%, 99%, or any amount of the counteracting force therebetween). In some embodiments, the drill bit 1202 transmits some or all of the force to the motor anchors 1212, which in turn transmits some or all of the force to the corresponding recesses 1256 of the clutch ring 1250. The interaction between the motor anchors 1212 and the corresponding recesses 1256 can maintain the clutch assembly 1205 in the locked configuration, as discussed previously.

When the drill bit 1202 breaks partially or fully through the target tissue, the opposing force against the drill bit 1202 can decrease or disappear altogether. The decrease in force can allow the drill assembly 1203 to move distally relative to the housing 1220 over a short distance (e.g., a plunge distance). The distal motion of the drill assembly 1203 can disengage the motor anchors 1212 from the recesses 1256 of the clutch ring 1250, thus allowing the clutch ring 1250 to rotate in response to the biasing force from the clutch spring 1260. The rotation of the clutch ring 1250 can align (e.g., vertically) the ring tracks 1252 of the clutch ring 1250 with the anchor tracks 1242 of the clutch anchor element 1240 and the motor anchors 1212 of the drill assembly 1203. When the ring tracks 1252, anchor tracks 1242, and motor anchors 1212 are aligned, the first spring element 1270 can expand in a proximal direction from its loaded length back to its resting or unloaded length, moving the drill assembly 1203 in a proximal direction. For example, the motor anchors 1212 can move in a proximal direction at least partially through the aligned (e.g., vertically) ring tracks 1252 and/or the anchor tracks 1242. Additionally, the motor 1210 can move in a proximal direction at least partially through the aperture 1254 of the clutch ring 1250 and/or at least partially though the aperture 1244 of the clutch anchor element 1240. The proximal motion of the drill assembly 1203 can retract the drill bit 1202 at least partially within the housing 1220. In some embodiments, the drill bit 1202 is retracted entirely into the housing 1220. In other embodiments, the drill bit 1202 can be retracted only partially into the housing 1220 or remain entirely outside the housing 1220. For example, the retraction distance can be at least 0.5 mm, 1 mm, 2 mm, 3 mm, 4 mm, 5 mm, 10 mm, 15 mm, 20 mm, 25 mm, and/or any distance therebetween.

EXAMPLES

Several aspects of the present technology are set forth in the following examples:

1. A surgical drilling device comprising:
   a drill bit; and
   a retraction mechanism comprising—
   a housing,
   a slide assembly within the housing and operably coupled to the drill bit,
   a spring element engaging the slide assembly, and
   a locking element coupled to the slide assembly and movable between a locked configuration and an unlocked configuration based on an amount of force applied by the drill bit to the slide assembly,
   wherein when in the locked configuration, the locking element secures the slide assembly to the housing, and
   wherein when in the unlocked configuration, the locking element allows the spring element to displace the slide assembly proximally within the housing to retract the drill bit.
2. The surgical drilling device of example 1 wherein the locking element remains in the locked configuration when the amount of force applied by the drill bit exceeds a threshold, and wherein the locking element moves to the unlocked configuration when the amount of force applied by the drill bit falls below the threshold.
3. The surgical drilling device of example 1 or example 2 wherein the locking element is configured to rotate between the locked configuration and the unlocked configuration.
4. The surgical drilling device of any one of examples 1-3 wherein:
   the housing includes an aperture;
   the locking element includes a protrusion;
   when the locking element is in the locked configuration, the protrusion engages the aperture; and
   when the locking element is in the unlocked configuration, the protrusion is released from the aperture.
5. The surgical drilling device of any one of examples 1–4 wherein the slide assembly comprises:
   a collar structure coupled to the locking element such that distal displacement of the collar structure moves the locking element from the locked configuration to the unlocked configuration, and
   a second spring element proximal to and engaging the collar structure.
6. The surgical drilling device of example 5 wherein the second spring element is configured to apply a first force against the collar structure and the drill bit is configured to apply a second force against the collar structure, the second force opposing the first force.
7. The surgical drilling device of example 6 wherein when the first force applied by the drill bit is less than the second force applied by the second spring element, the second spring element displaces the collar structure distally to move the locking element into the unlocked configuration.
8. The surgical drilling device of any one of examples 1-7, further comprising an elongated shaft coupling the drill bit to a motor.
9. The surgical drilling device of example 8 wherein the slide assembly is operably coupled to the drill bit via the elongated shaft.
10. The surgical drilling device of any one of examples 1-9, further comprising a reset mechanism configured to displace the slide assembly distally within the housing.
11. The surgical drilling device of any one of examples 1-10, further comprising a trigger mechanism configured to maintain the locking element in the locked configuration before the drill bit has been actuated.
12. A method of operating a surgical drill, the method comprising:
    drilling into a tissue using a drill bit operably coupled to a retraction mechanism with a locking element;
    applying a force against the retraction mechanism via the drill bit, wherein the applied force maintains the locking element in a locked configuration;
    decreasing the force against the retraction mechanism when the drill bit penetrates at least partially through the tissue, wherein the decreased force causes the locking element to move into an unlocked configuration; and
    retracting the drill bit via the retraction mechanism when the locking element is in the unlocked configuration.
13. The method of example 12 wherein applying the force against the retraction mechanism comprises rotating the locking element in a first direction, and wherein decreasing the force against the retraction mechanism comprises rotating the locking element in a second direction opposite the first direction.
14. The method of example 12 or example 13 wherein:
    the retraction mechanism includes a slide assembly received within a housing and operably coupled to the drill bit such that movement of the slide assembly produces a corresponding movement of the drill bit;
    when the locking element is in the locked configuration, the slide assembly is secured to the housing; and
    when the locking element is in the unlocked configuration, the slide assembly is movable relative to the housing.
15. The method of example 14 wherein retracting the drill bit comprises displacing the slide assembly proximally within the housing.
16. The method of any one of examples 12-15 wherein the retraction mechanism comprises a spring element coupled to a collar structure, and wherein the force applied via the drill bit causes the collar structure to deform the spring element from a resting length to a loaded length different from the resting length.
17. The method of example 16 wherein decreasing the force causes the spring element to revert from the loaded length towards the resting length and displace the collar structure distally, and wherein distal displacement of the collar structure moves the locking element into the unlocked configuration.
18. The method of any one of examples 12-17 wherein the drill bit is retracted automatically when the drill bit penetrates at least partially through the tissue.
19. The method of any one of examples 12-18 wherein the drill bit penetrates no more than 1 mm past the tissue before being retracted.
20. The method of any one of examples 12-19 wherein the tissue comprises a skull, and further comprising placing a catheter into the skull.

CONCLUSION

The above detailed description of embodiments of the technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A surgical drilling device comprising:
    a drill bit; and
    a retraction mechanism comprising—
        a housing,
        a slide assembly within the housing and operably coupled to the drill bit,
        a spring element engaging the slide assembly, and
        a locking element coupled to the slide assembly and movable between a locked configuration and an unlocked configuration based on an amount of force applied by the drill bit to the slide assembly,
        wherein when in the locked configuration, the locking element secures the slide assembly to the housing, and
        wherein when in the unlocked configuration, the locking element allows the spring element to displace the slide assembly proximally within the housing to retract the drill bit.

2. The surgical drilling device of claim 1 wherein the locking element remains in the locked configuration when the amount of force applied by the drill bit exceeds a threshold, and wherein the locking element moves to the unlocked configuration when the amount of force applied by the drill bit falls below the threshold.

3. The surgical drilling device of claim 1 wherein the locking element is configured to rotate between the locked configuration and the unlocked configuration.

4. The surgical drilling device of claim 1 wherein:
    the housing includes an aperture;
    the locking element includes a protrusion;
    when the locking element is in the locked configuration, the protrusion engages the aperture; and
    when the locking element is in the unlocked configuration, the protrusion is released from the aperture.

5. The surgical drilling device of claim 4 wherein the slide assembly comprises:
    a collar structure coupled to the locking element such that distal displacement of the collar structure moves the locking element from the locked configuration to the unlocked configuration, and
    a second spring element proximal to and engaging the collar structure.

6. The surgical drilling device of claim 5 wherein the second spring element is configured to apply a first force against the collar structure and the drill bit is configured to apply a second force against the collar structure, the second force opposing the first force.

7. The surgical drilling device of claim 6 wherein when the first force applied by the drill bit is less than the second force applied by the second spring element, the second spring element displaces the collar structure distally to move the locking element into the unlocked configuration.

8. The surgical drilling device of claim 1, further comprising an elongated shaft coupling the drill bit to a motor.

9. The surgical drilling device of claim 8 wherein the slide assembly is operably coupled to the drill bit via the elongated shaft.

10. The surgical drilling device of claim 1, further comprising a reset mechanism configured to displace the slide assembly distally within the housing.

11. The surgical drilling device of claim 1, further comprising a trigger mechanism configured to maintain the locking element in the locked configuration before the drill bit has been actuated.

12. A method of operating a surgical drill, the method comprising:
    drilling into a tissue using a drill bit operably coupled to a retraction mechanism with a locking element, wherein the retraction mechanism includes a slide assembly received within a housing and operably coupled to the drill bit such that movement of the slide assembly produces a corresponding movement of the drill bit;
    applying a force against the retraction mechanism via the drill bit, wherein the applied force maintains the locking element in a locked configuration in which the slide assembly is secured to the housing;
    decreasing the force against the retraction mechanism when the drill bit penetrates at least partially through the tissue, wherein the decreased force causes the locking element to move into an unlocked configuration in which the slide assembly is movable relative to the housing; and
    retracting the drill bit via the retraction mechanism when the locking element is in the unlocked configuration.

13. The method of claim 12 wherein applying the force against the retraction mechanism comprises rotating the locking element in a first direction, and wherein decreasing the force against the retraction mechanism comprises rotating the locking element in a second direction opposite the first direction.

14. The method of claim 12 wherein retracting the drill bit comprises displacing the slide assembly proximally within the housing.

15. The method of claim 12 wherein the retraction mechanism comprises a spring element coupled to a collar structure, and wherein the force applied via the drill bit causes the collar structure to deform the spring element from a resting length to a loaded length different from the resting length.

16. The method of claim 15 wherein decreasing the force causes the spring element to revert from the loaded length towards the resting length and displace the collar structure distally, and wherein distal displacement of the collar structure moves the locking element into the unlocked configuration.

17. The method of claim 12 wherein the drill bit is retracted automatically when the drill bit penetrates at least partially through the tissue.

18. The method of claim 12 wherein the drill bit penetrates no more than 1 mm past the tissue before being retracted.

19. The method of claim 12 wherein the tissue comprises a skull, and further comprising placing a catheter into the skull.

* * * * *